US012568161B2

(12) United States Patent
Kim et al.

(10) Patent No.: US 12,568,161 B2
(45) Date of Patent: Mar. 3, 2026

(54) DISPLAY DEVICE

(71) Applicant: Samsung Display Co., LTD., Yongin-si (KR)

(72) Inventors: Young Do Kim, Yongin-si (KR); Sunghoon Kim, Yongin-si (KR); Sungguk An, Yongin-si (KR); Soojung Lee, Yongin-si (KR); Chul Ho Jeong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 70 days.

(21) Appl. No.: 18/439,841

(22) Filed: Feb. 13, 2024

(65) Prior Publication Data

US 2024/0283857 A1 Aug. 22, 2024

(30) Foreign Application Priority Data

Feb. 17, 2023 (KR) ........................ 10-2023-0021488

(51) Int. Cl.
*B32B 3/10* (2006.01)
*H04M 1/02* (2006.01)
(52) U.S. Cl.
CPC ................................ *H04M 1/0222* (2013.01)
(58) Field of Classification Search
None
See application file for complete search history.

(56) References Cited

U.S. PATENT DOCUMENTS

| | | | |
|---|---|---|---|
| 9,639,121 B2 | 5/2017 | Min et al. | |
| 2021/0233447 A1* | 7/2021 | Park ...................... | G06F 1/1616 |

| | | | |
|---|---|---|---|
| 2022/0011819 A1* | 1/2022 | Shin ...................... | G06F 1/1641 |
| 2022/0068167 A1* | 3/2022 | Park ...................... | G06F 1/1616 |
| 2022/0231239 A1* | 7/2022 | Ryu ........................ | B32B 5/18 |

(Continued)

FOREIGN PATENT DOCUMENTS

| | | |
|---|---|---|
| JP | 2013083010 A | 5/2013 |
| KR | 20190014233 A | 2/2019 |
| KR | 102051803 B1 | 1/2020 |

(Continued)

OTHER PUBLICATIONS

Machine translation of KR-20220105690-A (Year: 2022).*

(Continued)

*Primary Examiner* — Christopher M Polley

(74) *Attorney, Agent, or Firm* — CANTOR COLBURN LLP

(57) ABSTRACT

A display device includes a display module including a folding display portion, a first non-folding display portion, and a second non-folding display portion, and a support plate disposed below the display module and including a folding support portion, a first non-folding support portion, and a second non-folding support portion, wherein the support plate includes a matrix portion, first fibers dispersed in the matrix portion, and second fibers dispersed in the matrix portion, the first fibers each include a plurality of first sub-fibers corresponding to the folding support portion and spaced apart at a first interval, and a plurality of second sub-fibers corresponding to the first non-folding support portion and the second non-folding support portion and spaced apart at a second interval which is smaller than the first interval.

21 Claims, 18 Drawing Sheets

(56)                    References Cited

U.S. PATENT DOCUMENTS

2023/0278167 A1* 9/2023 Cho .......................... B24C 1/04

FOREIGN PATENT DOCUMENTS

KR      20220086347 A      6/2022
KR      20220105690 A  *  7/2022  ............. B32B 3/266
KR         102533507 B1 *  5/2023  ........... B32B 27/365

OTHER PUBLICATIONS

Machine translation of KR-102533507-B1 (Year: 2023).*
Kim et al.; "Robust and Superhydrophobic PTFE Membranes with Crosshatched Nanofibers for Membrane Distillation and Carbon Dioxide Stripping"; Advanced Materials Interfaces 2022, 9, 2200786; 10 pages.

* cited by examiner

DISPLAY DEVICE

This application claims priority to Korean Patent Application No. 10-2023-0021488, filed on Feb. 17, 2023, and all the benefits accruing therefrom under 35 U.S.C. § 119, the content of which in its entirety is herein incorporated by reference.

BACKGROUND

1. Field

The present disclosure herein relates to a display device including a support plate.

2. Description of the Related Art

Multimedia electronic devices such as televisions, mobile phones, tablet computers, navigation systems, and game consoles may be provided with display panels for displaying images and input sensors for sensing external inputs. With the recent development of technology, electronic devices which include flexible display panels, and various types of flexible electronic devices configured to be curvedly deformed, folded, or rolled have been developed. The flexible electronic devices that are deformable into various forms may allow for ease of portability and increased user friendliness. Stacked members included in the flexible electronic devices are required to be easily folded or bent, to have sufficient mechanical properties, and to be lightweight for greater user friendliness.

SUMMARY

The present disclosure provides a display device having excellent impact resistance and excellent folding properties.

An embodiment of the invention provides a display device that is divided into a folding region foldable with respect to a virtual folding axis extending in a first direction, and a first non-folding region and a second non-folding region, which are spaced apart in a second direction that is perpendicular to the first direction with the folding region therebetween, and includes a display module including a folding display portion corresponding to the folding region, a first non-folding display portion corresponding to the first non-folding region, and a second non-folding display portion corresponding to the second non-folding region, and a support plate disposed below the display module and including a folding support portion corresponding to the folding region, a first non-folding support portion corresponding to the first non-folding region, and a second non-folding support portion corresponding to the second non-folding region, wherein the support plate includes a matrix portion, a plurality of first fibers dispersed in the matrix portion, extending in the first direction, and spaced apart in the second direction, and a plurality of second fibers dispersed in the matrix portion, disposed above or below the first fibers and extending in the second direction, and spaced apart in the first direction, wherein the first fibers each include a plurality of first sub-fibers corresponding to the folding support portion and spaced apart at a first interval, and a plurality of second sub-fibers corresponding to the first non-folding support portion and the second non-folding support portion and spaced apart at a second interval which is smaller than the first interval.

In an embodiment, the folding support portion may have a smaller Young's modulus at about 25° C. than the first non-folding support portion and the second non-folding support portion.

In an embodiment, the folding support portion may have a Young's modulus of about 0.1 GPa to about 10 GPa at about 25° C.

In an embodiment, the first non-folding support portion and the second non-folding support portion may each have a Young's modulus of about 5 GPa to about 150 GPa at about 25° C.

In an embodiment, the first fibers may further include third sub-fibers spaced apart at a third interval which is smaller than the first interval and greater than the second interval, between the first sub-fibers and the second sub-fibers.

In an embodiment, the first fibers and the second fibers may each include glass fibers or carbon fibers.

In an embodiment, the matrix portion may include at least one of a polyepoxy-based resin, a polyester-based resin, a polyamide-based resin, a polycarbonate-based resin, a polypropylene-based resin, a polybutylene-based resin, or a polyvinyl ester-based resin.

In an embodiment, the support plate may have a thickness of about 50 μm to about 300 μm.

In an embodiment, the matrix portion may be formed as a single layer.

In an embodiment of the invention, a display device that is divided into a folding region foldable with respect to a virtual folding axis extending in a first direction, and a first non-folding region and a second non-folding region, which are spaced apart in a second direction which is perpendicular to the first direction with the folding region therebetween includes a display module including a folding display portion corresponding to the folding region, a first non-folding display portion corresponding to the first non-folding region, and a second non-folding display portion corresponding to the second non-folding region, and a support plate disposed below the display module and including a folding support portion corresponding to the folding region, a first non-folding support portion corresponding to the first non-folding region, and a second non-folding support portion corresponding to the second non-folding region, and including a plurality of sub-support plates stacked in a thickness direction, wherein the sub-support plates each include a matrix portion, a plurality of first fibers dispersed in the matrix portion, extending in the first direction, and spaced apart in the second direction, and a plurality of second fibers dispersed in the matrix portion, disposed above or below the first fibers and extending in the second direction, and spaced apart in the first direction, and the number of first crossing points in which the first fibers and the second fibers cross per unit area at a portion corresponding to the folding support portion is smaller than the number of second crossing points in which the first fibers and the second fibers cross per unit area at a portion corresponding to the first non-folding support portion and the second non-folding support portion.

In an embodiment, the folding support portion may have a smaller Young's modulus at about 25° C. than each of the first non-folding support portion and the second non-folding support portion.

In an embodiment, the folding support portion may have a Young's modulus of about 0.1 GPa to about 10 GPa.

In an embodiment, the first non-folding support portion and the second non-folding support portion may each have a Young's modulus of about 5 GPa to about 150 GPa.

In an embodiment, an interval between the first fibers may decrease in a direction further away from the folding axis from a portion adjacent to the folding axis.

In an embodiment, the first fibers and the second fibers may each include glass fibers and/or carbon fibers.

In an embodiment, the matrix portion may include at least one of a polyepoxy-based resin, a polyester-based resin, a polyamide-based resin, a polycarbonate-based resin, a polypropylene-based resin, a polybutylene-based resin, or a polyvinyl ester-based resin.

In an embodiment, the support plate may have a thickness of about 50 $\mu$m to about 300 $\mu$m.

In an embodiment of the invention, a display device that is divided into a folding region foldable with respect to a virtual folding axis extending in a first direction, and a first non-folding region and a second non-folding region, which are spaced apart in a second direction which is perpendicular to the first direction with the folding region therebetween includes a display module including a folding display portion corresponding to the folding region, a first non-folding display portion corresponding to the first non-folding region, and a second non-folding display portion corresponding to the second non-folding region, and a support plate disposed below the display module and including a folding support portion corresponding to the folding region, a first non-folding support portion corresponding to the first non-folding region, and a second non-folding support portion corresponding to the second non-folding region, and including a plurality of sub-support plates stacked in a thickness direction, wherein the sub-support plates each include a matrix portion, a plurality of first fibers dispersed in the matrix portion, extending in the first direction, and spaced apart in the second direction, and a plurality of second fibers dispersed in the matrix portion, disposed above or below the first fibers and extending in the second direction, and spaced apart in the first direction, and the number of the first fibers disposed per unit area at a portion corresponding to the folding support portion is smaller than the number of the first fibers disposed per unit area at each of the first non-folding support portion and the second non-folding support portion.

In an embodiment, the folding support portion may have a smaller Young's modulus than each of the first non-folding support portion and the second non-folding support portion, the folding support portion may have a Young's modulus of about 0.1 GPa to about 10 GPa, and the first non-folding support portion and the second non-folding support portion may each have a Young's modulus of about 5 GPa to about 150 GPa.

In an embodiment, the support plate may have a thickness of about 50 $\mu$m to about 300 $\mu$m.

In an embodiment, the first fibers and the second fibers may each include glass fibers or carbon fibers, and the matrix portion may include at least one of a polyepoxy-based resin, a polyester-based resin, a polyamide-based resin, a polycarbonate-based resin, a polypropylene-based resin, a polybutylene-based resin, or a polyvinyl ester-based resin.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings:

4

Figure 1A:
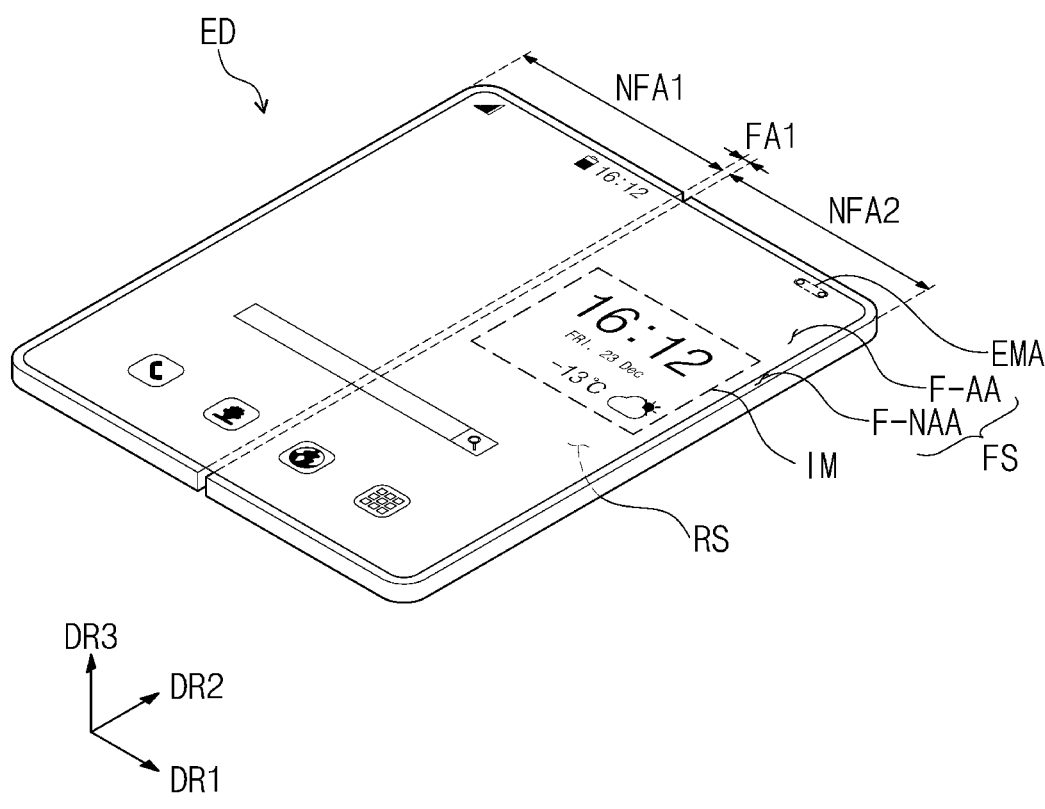
Figure 1B:
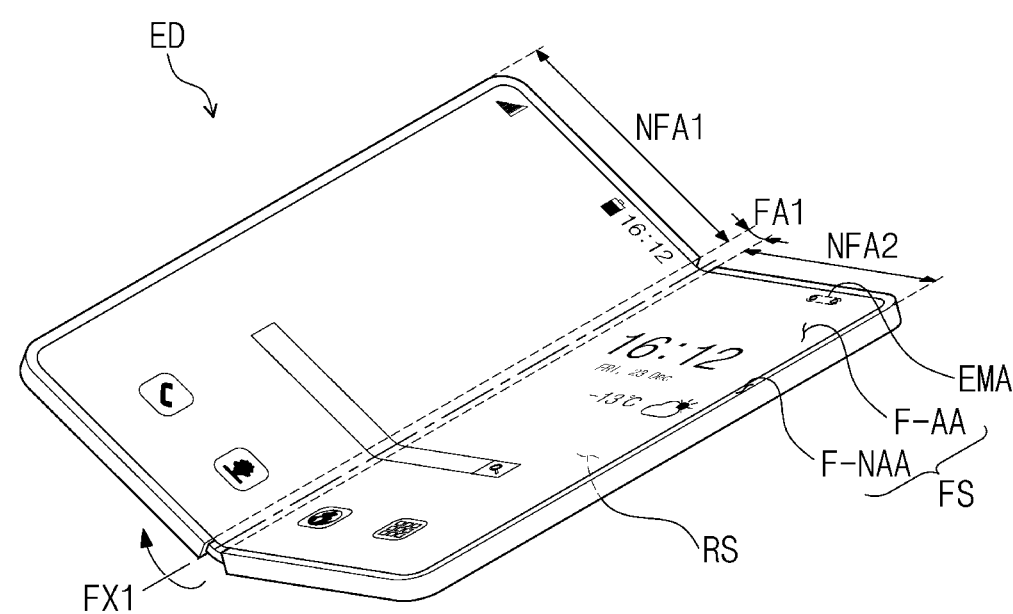
Figure 1B:
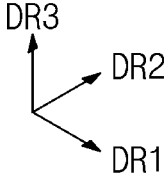
Figure 1C:
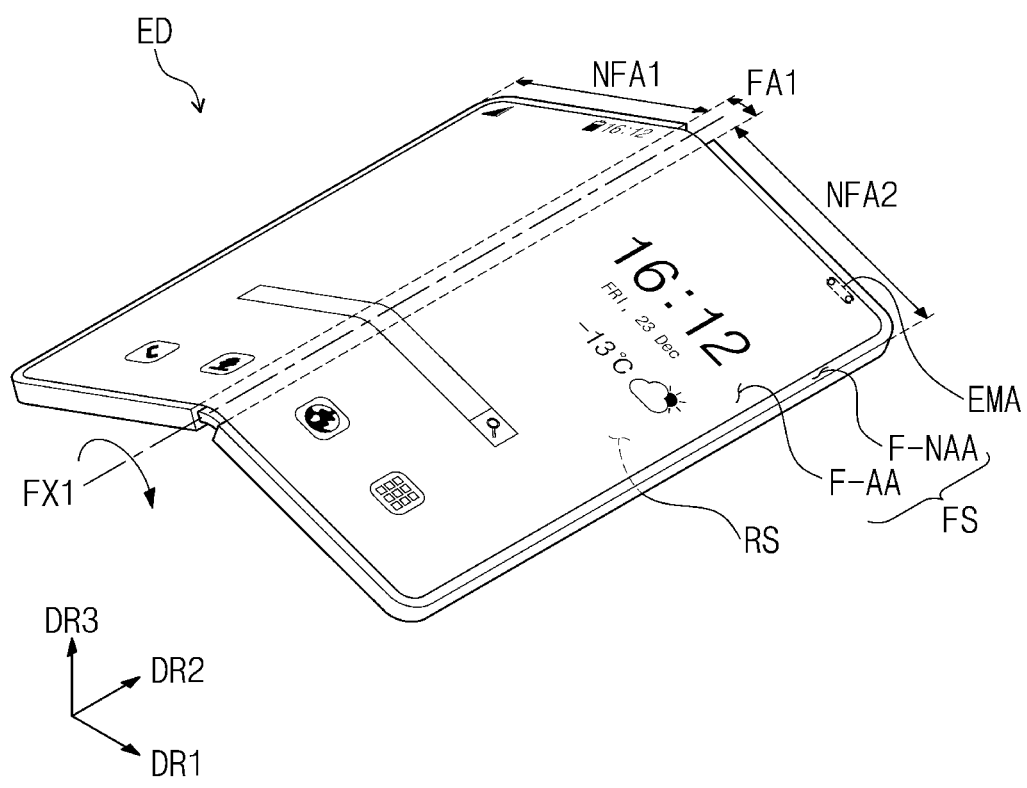
Figure 2A:
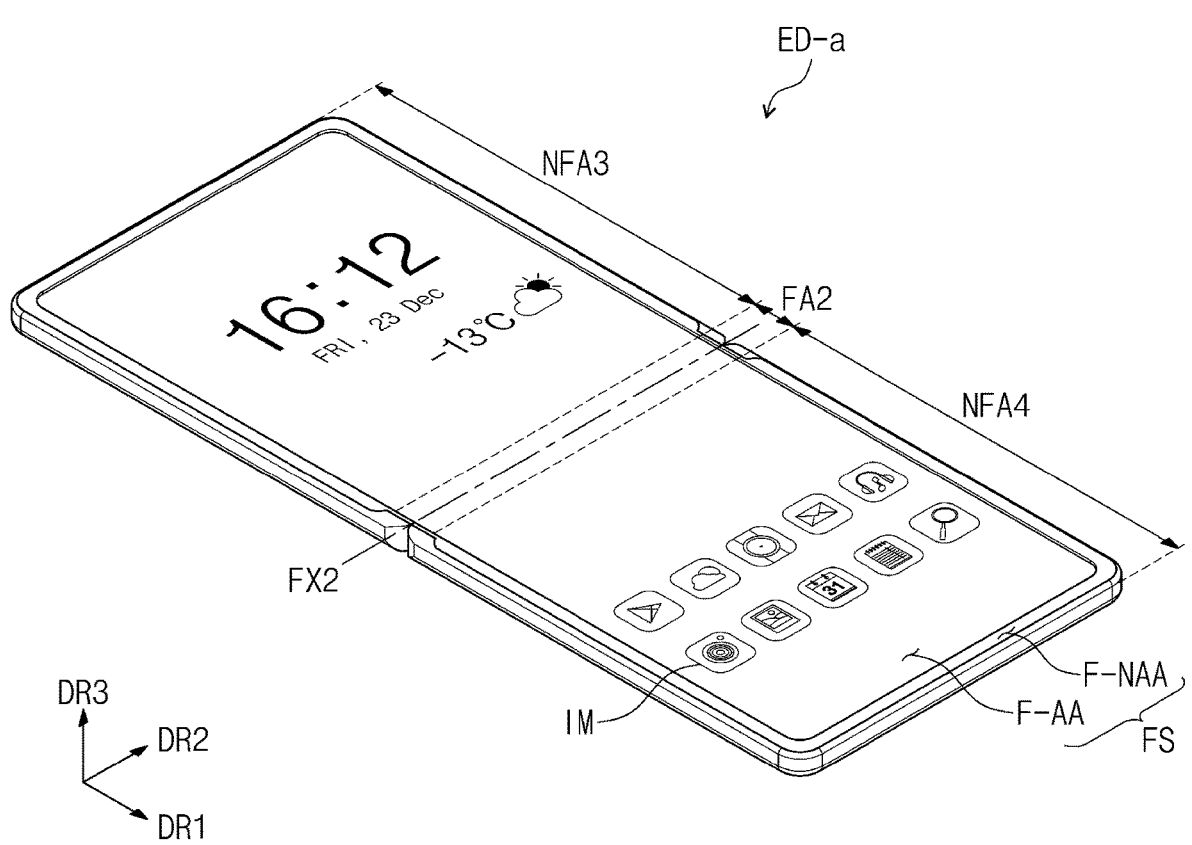
Figure 2B:
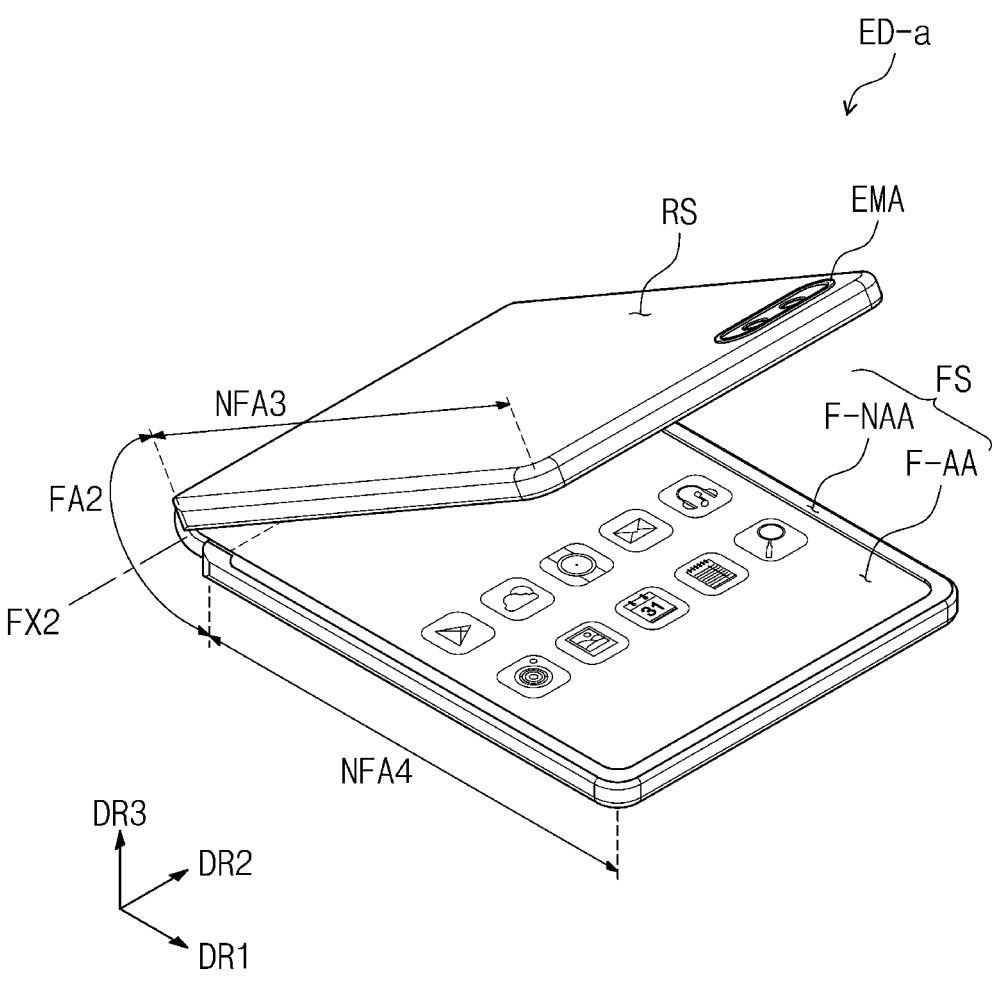
Figure 2C:
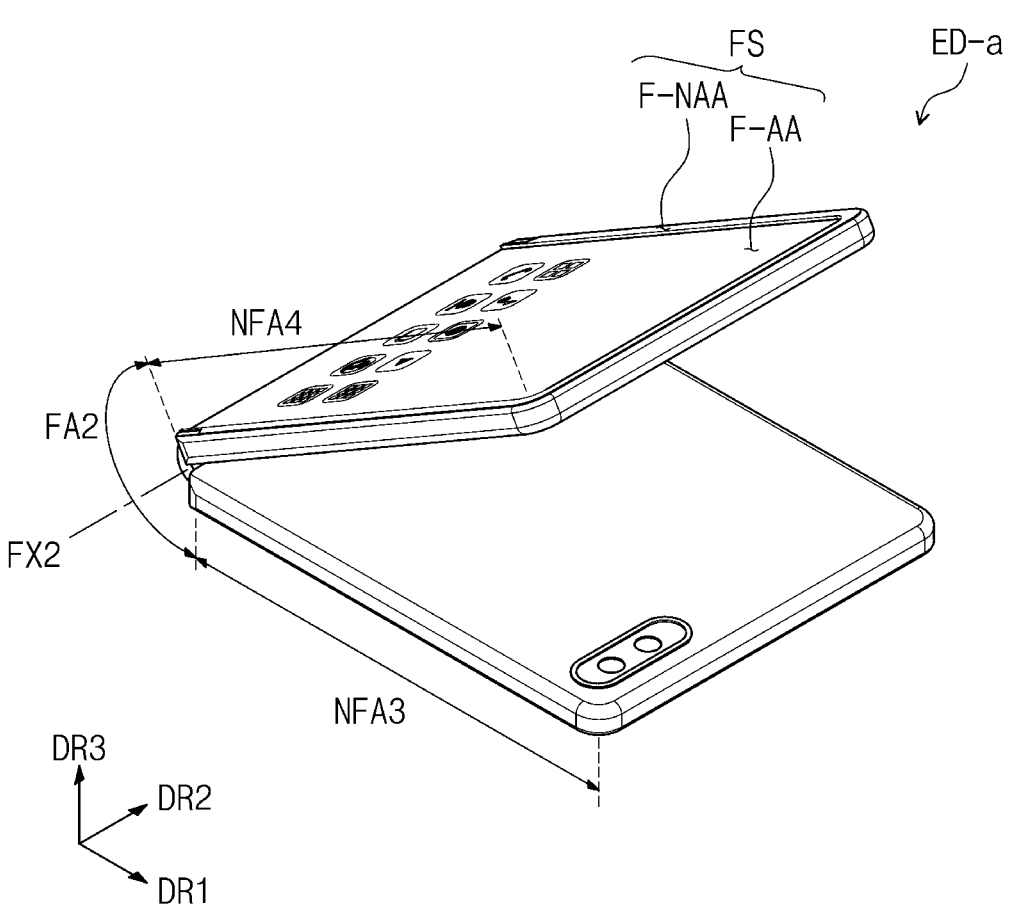
Figure 3:
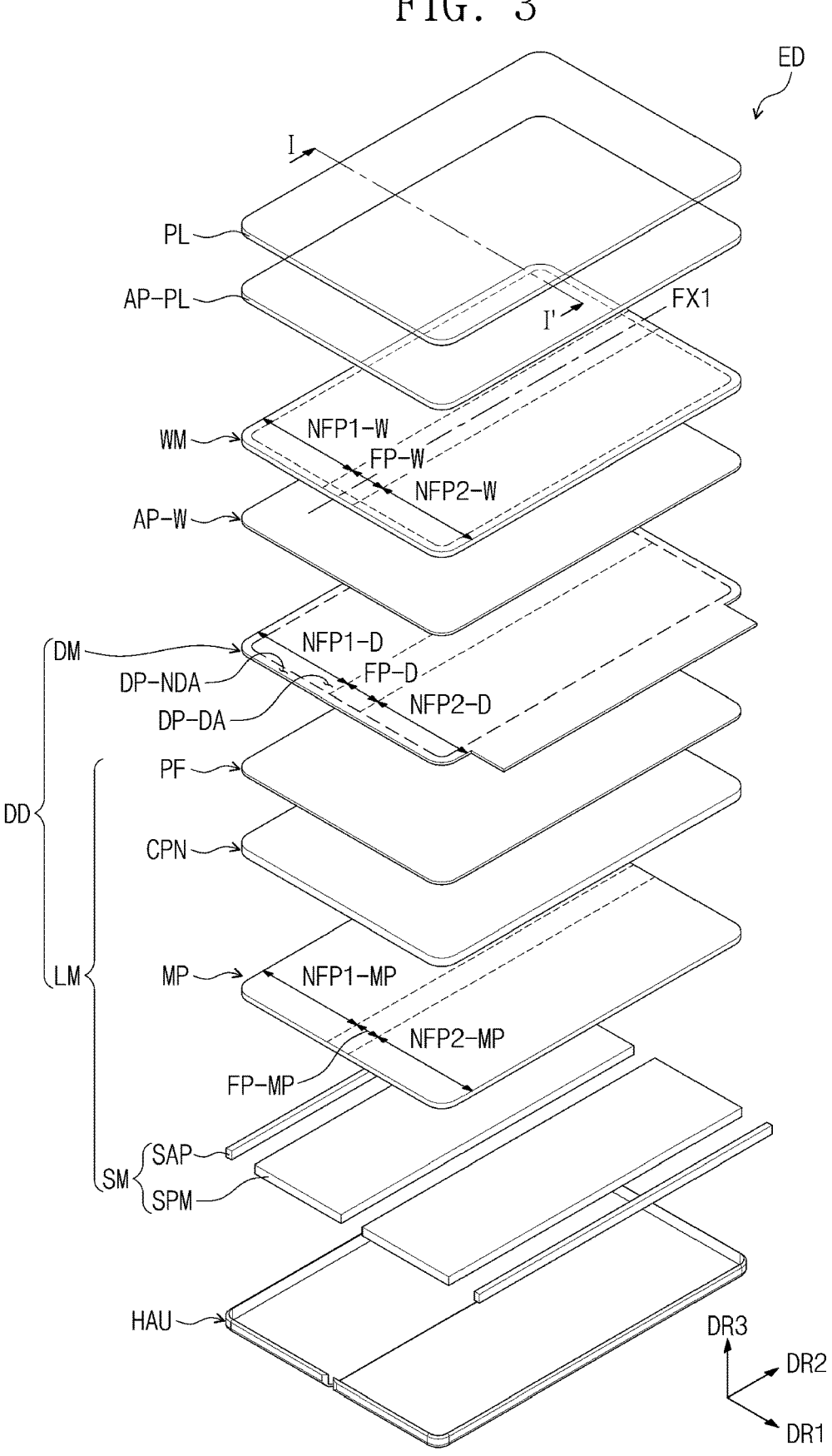
Figure 4:
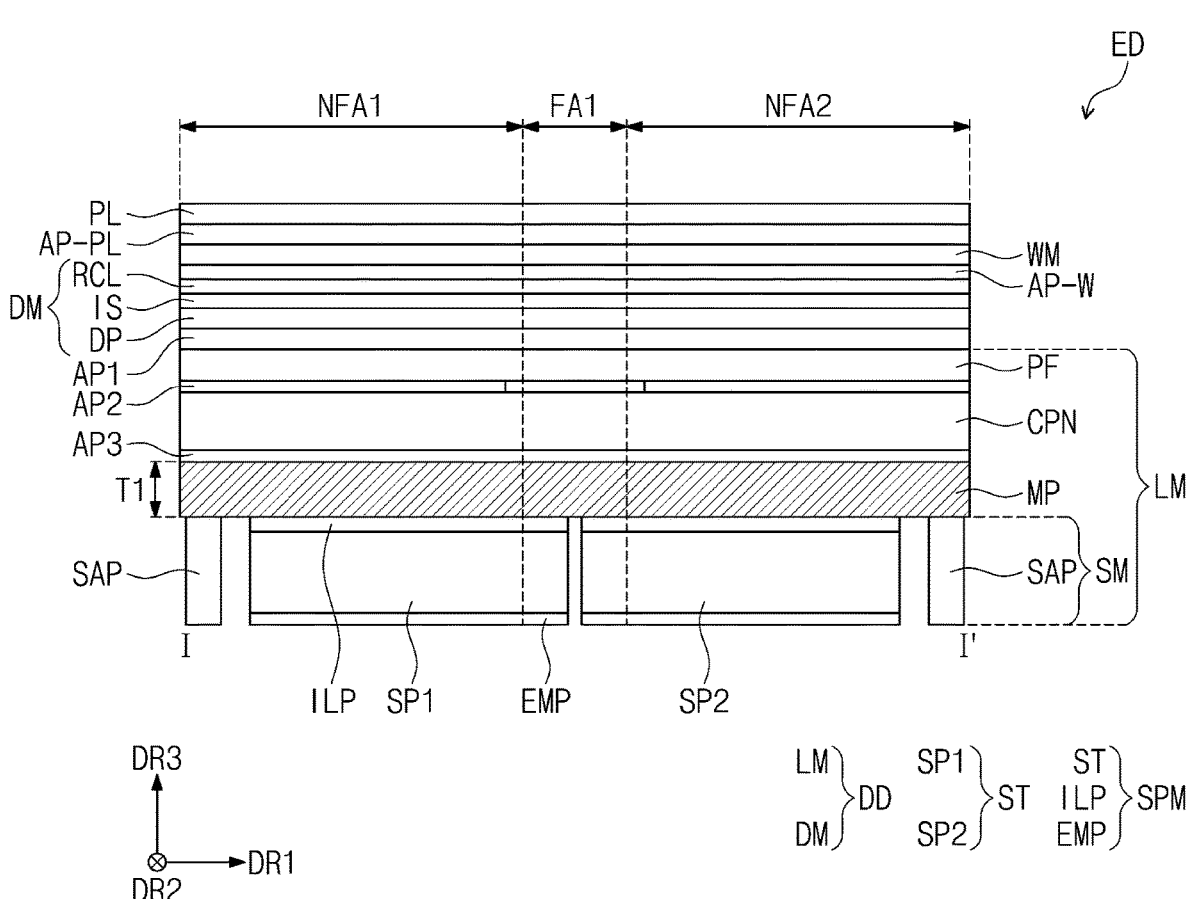
Figure 5A:
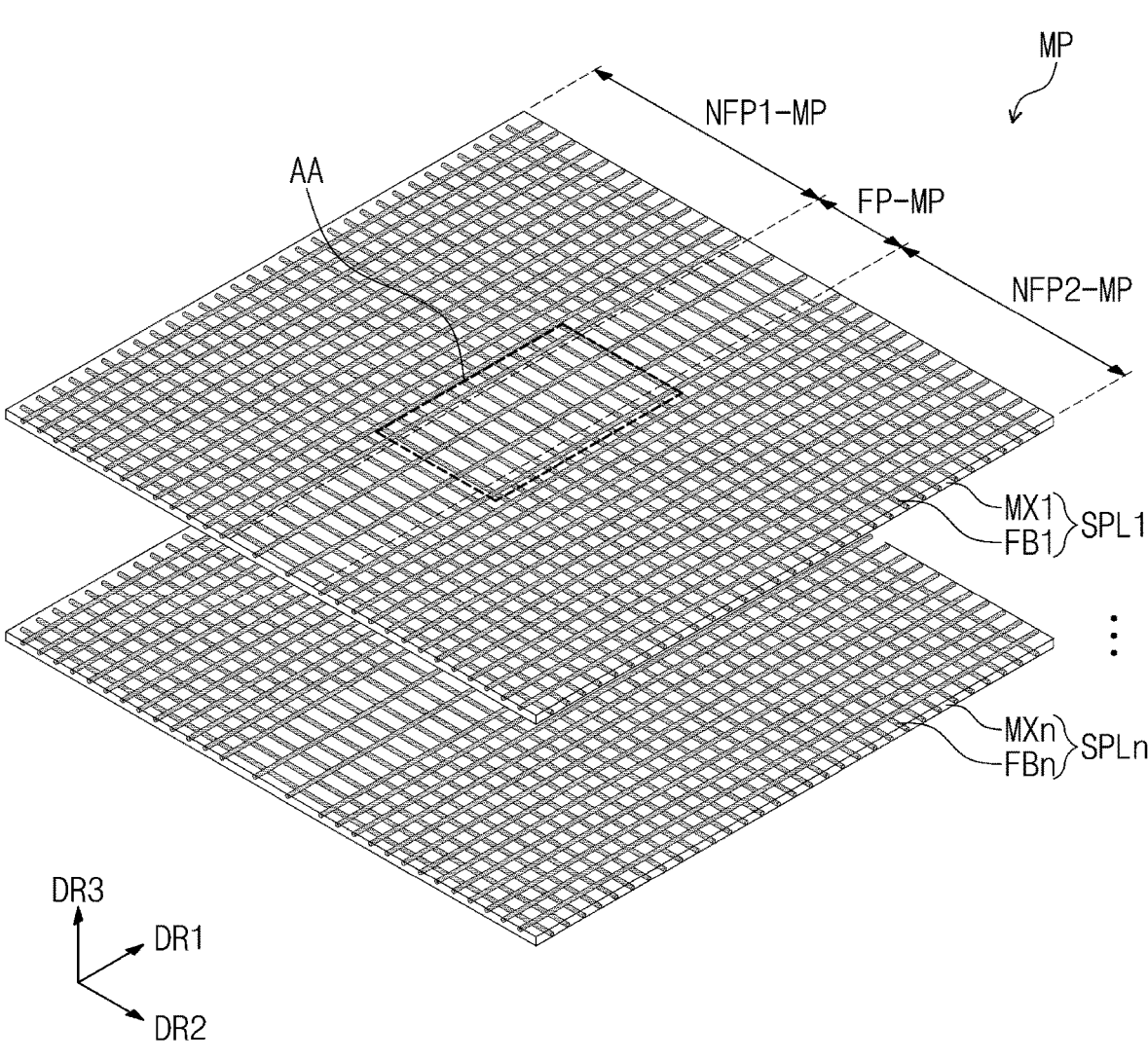
Figure 5B:
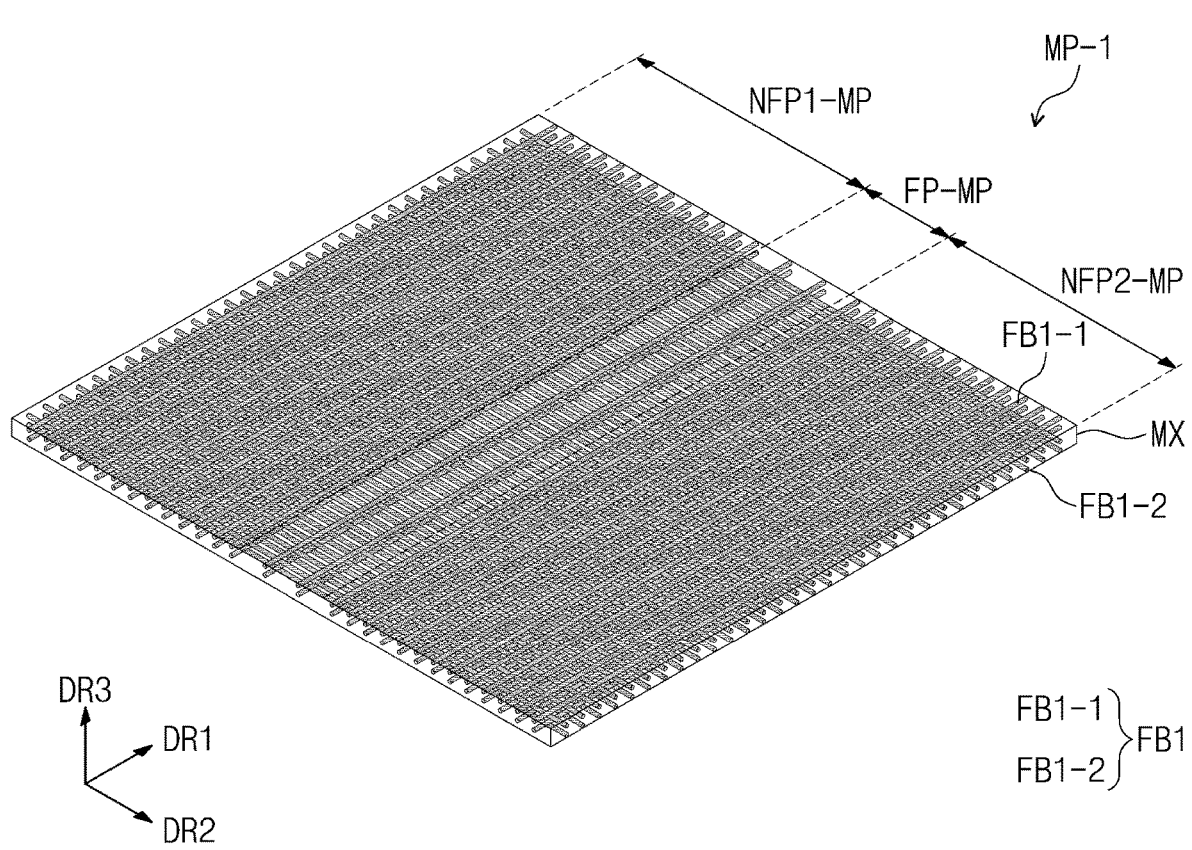
Figure 5C:
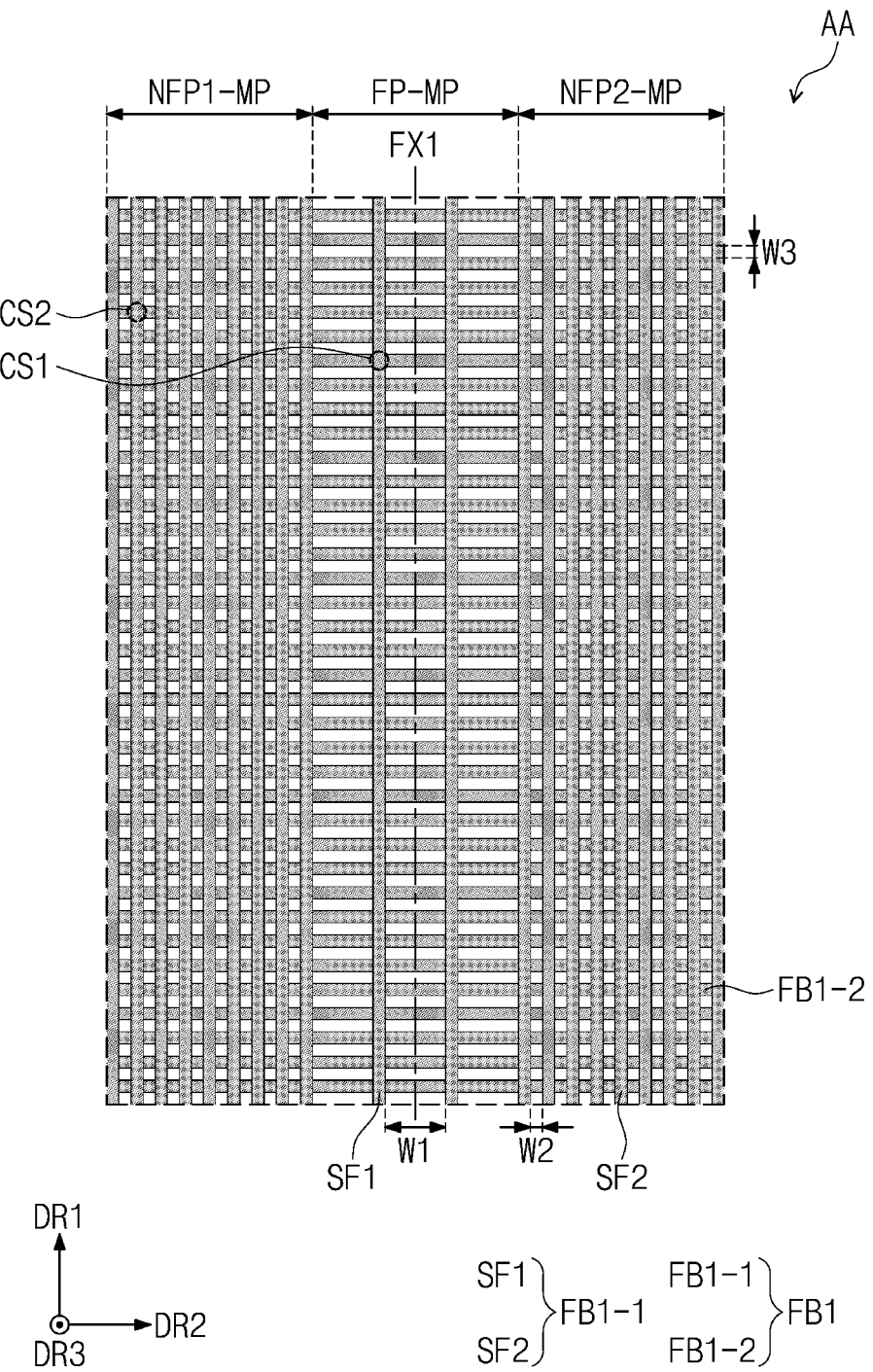
Figure 5D:
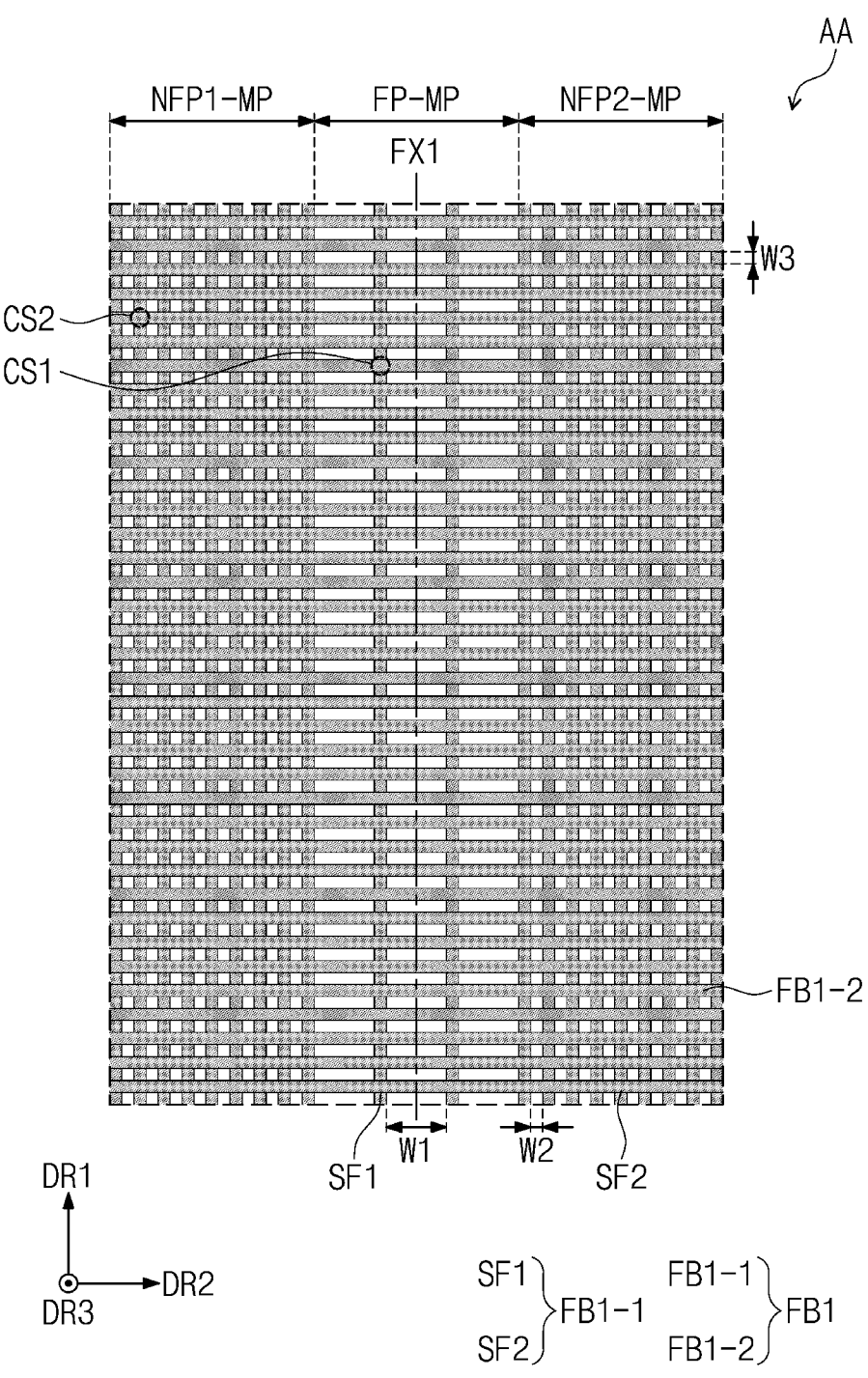
Figure 6:
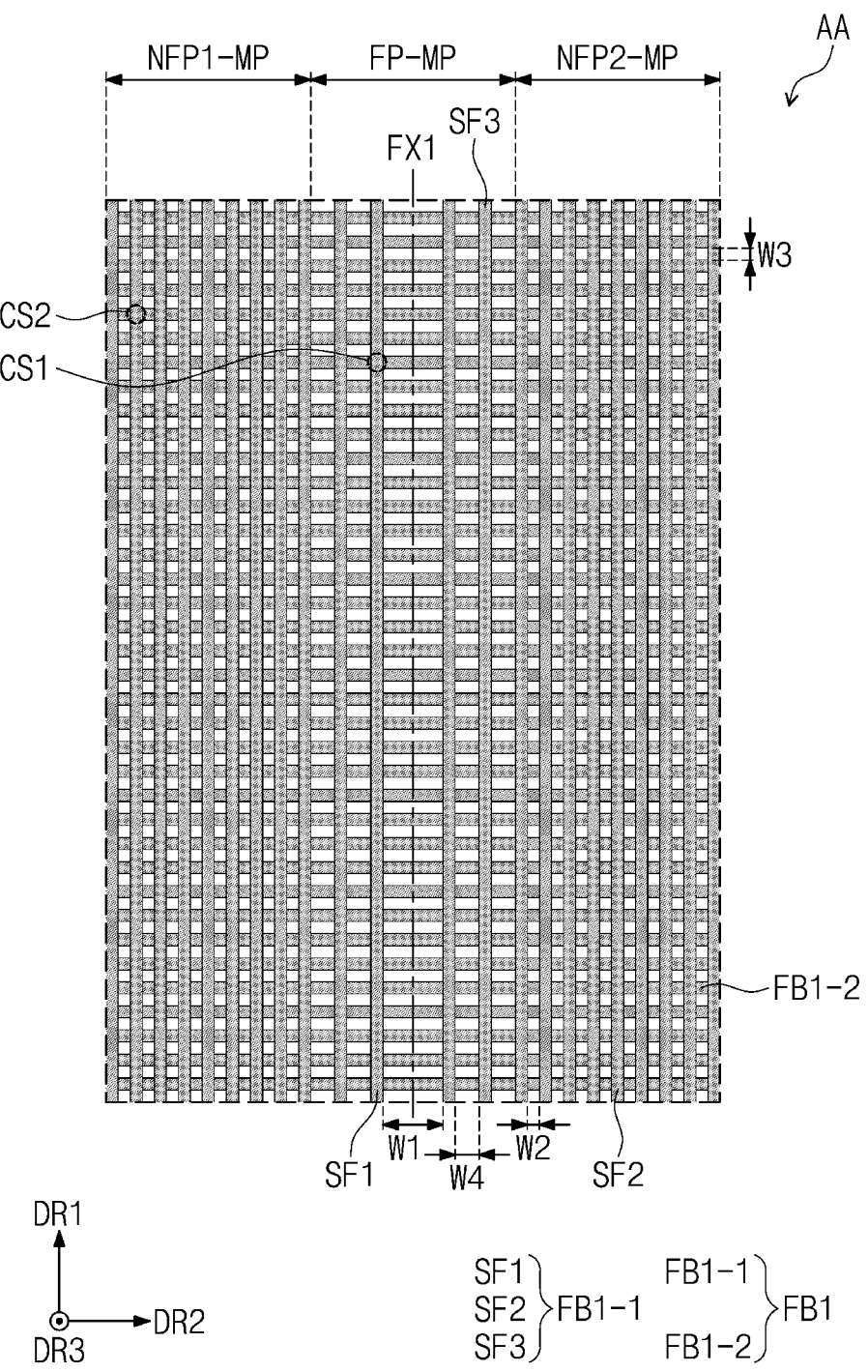
Figure 7:
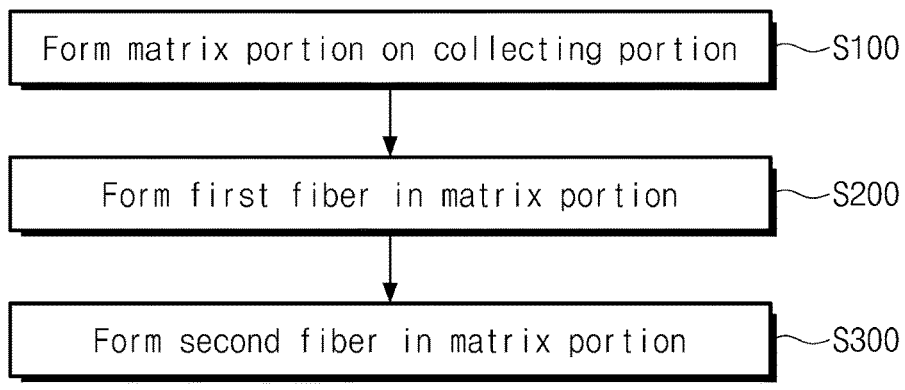
Figure 8:
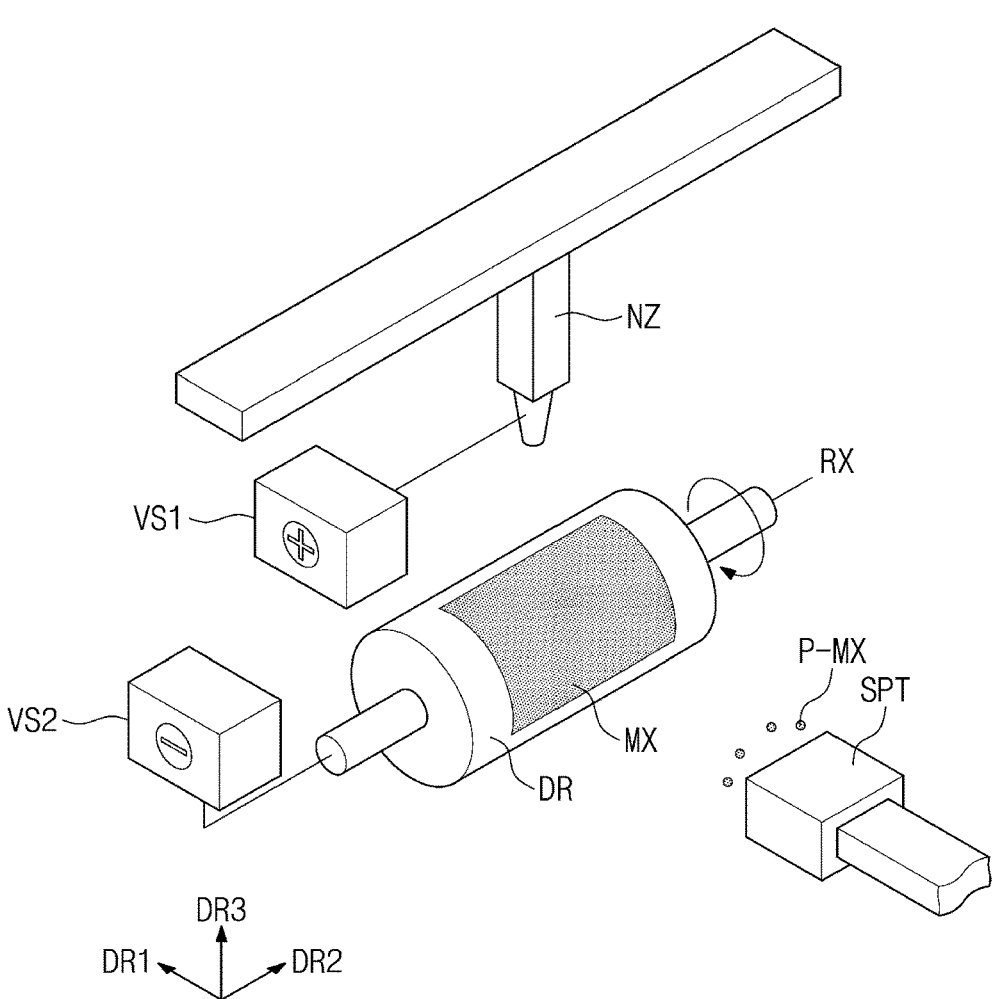
Figure 9:
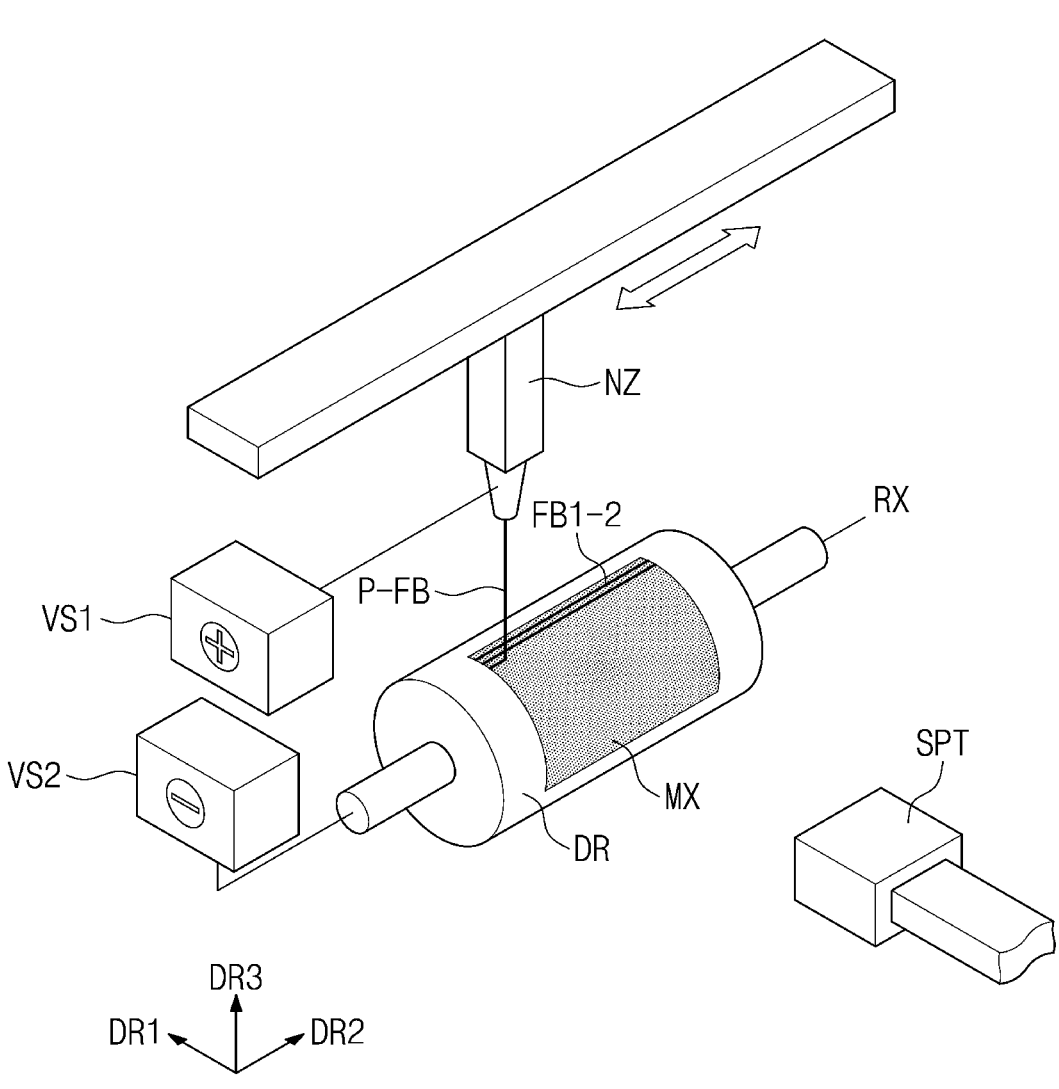
Figure 10:
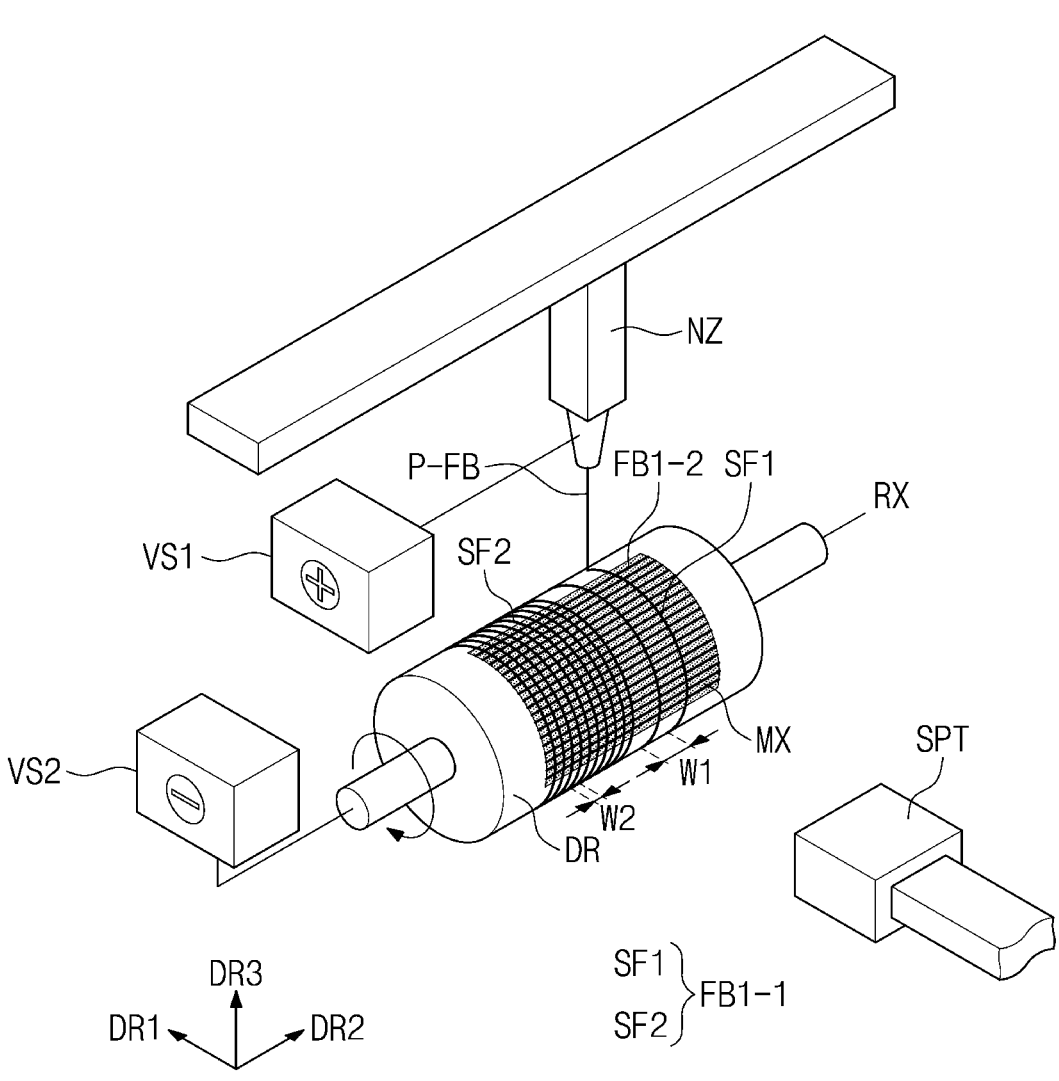
Figure 11A:
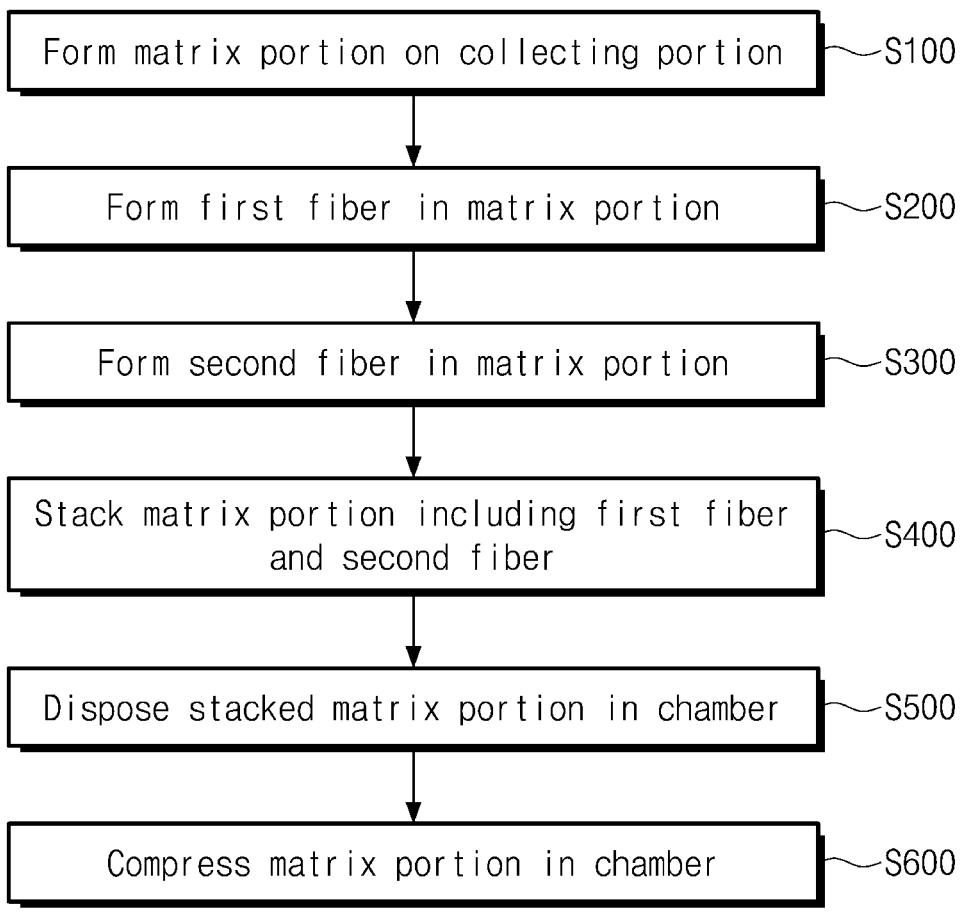
Figure 11B:
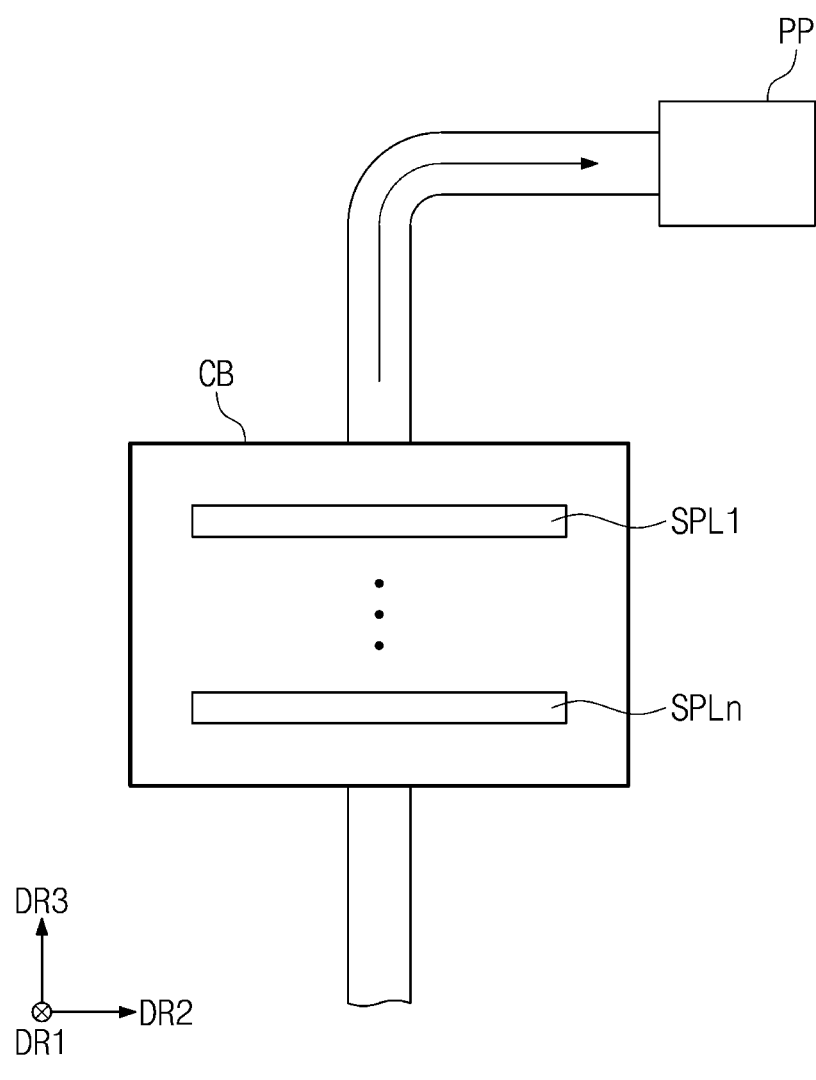

FIG. 1A is a perspective view showing an electronic device in a state of being unfolded according to an embodiment;

FIG. 1B is a perspective view showing an inner-folding process of the electronic device shown in FIG. 1A according to an embodiment;

FIG. 1C is a perspective view showing an outer-folding process of the electronic device shown in FIG. 1A according to an embodiment;

FIG. 2A is a perspective view showing an electronic device in a state of being unfolded according to an embodiment;

FIG. 2B is a perspective view showing an inner-folding process of the electronic device shown in FIG. 2A according to an embodiment;

FIG. 2C is a perspective view showing an outer-folding process of the electronic device shown in FIG. 2A according to an embodiment;

FIG. 3 is an exploded perspective view of an electronic device according to an embodiment;

FIG. 4 is a cross-sectional view of an electronic device according to an embodiment;

FIG. 5A is a schematic view of a support plate according to an embodiment;

FIG. 5B is a schematic view of a support plate according to an embodiment;

FIG. 5C is an enlarged view showing a support plate according to an embodiment;

FIG. 5D is an enlarged view showing a support plate according to an embodiment;

FIG. 6 is an enlarged view showing a support plate according to an embodiment;

FIG. 7 is a flowchart showing a method for manufacturing a support plate according to an embodiment;

FIG. 8 is a schematic view showing a step in a method for manufacturing a support plate according to an embodiment;

FIG. 9 is a schematic view showing a step in a method for manufacturing a support plate according to an embodiment;

FIG. 10 is a schematic view showing a step in a method for manufacturing a support plate according to an embodiment;

FIG. 11A is a flowchart showing a method for manufacturing a support plate according to an embodiment; and FIG. 11B is a schematic view showing a step in a method for manufacturing a support plate according to an embodiment.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It should be understood that the invention may be modified in many alternate forms, and thus specific embodiments will be exemplified in the drawings and described in detail. It should be understood, however, that it is not intended to limit the present disclosure to the particular forms disclosed, but rather, is intended to cover all modifications, equivalents, and alternatives falling within the spirit and scope of the present disclosure.

It will be understood that when an element (or a region, a layer, a portion, or the like) is referred to as "being on", "connected to" or "coupled to" another element, it may be directly disposed on, connected or coupled to the other element, or intervening elements may be disposed therebetween.

Like reference numerals refer to like elements. In addition, in the drawings, the thickness, the ratio, and the dimensions of elements are exaggerated for an effective description of technical contents. The term "and/or," includes all combinations of one or more of which associated configurations may define.

It will be understood that, although the terms first, second, etc. may be used herein to describe various elements, these elements should not be limited by these terms. These terms are only used to distinguish one element from another element. For example, a first element may be referred to as a second element, and similarly, a second element may be referred to as a first element without departing from the teachings of the present disclosure. The singular forms are intended to include the plural forms as well, unless the context clearly indicates otherwise. As used herein, the singular forms, "a", "an" and "the" are intended to include the plural forms as well, unless the context clearly indicates otherwise.

Also, terms of "below", "on lower side", "above", "on upper side", or the like may be used to describe the relationships of the components shown in the drawings. The terms are used as a relative concept and are described with reference to the direction indicated in the drawings.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof. As used herein, being "disposed directly on" may mean that there is no additional layer, film, region, plate, or the like between a part and another part such as a layer, a film, a region, a plate, or the like. For example, being "disposed directly on" may mean that two layers or two members are disposed without using an additional member such as an adhesive member, therebetween.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which the present disclosure pertains. It is also to be understood that terms defined in commonly used dictionaries should be interpreted as having meanings consistent with the meanings in the context of the related art, and are expressly defined herein unless they are interpreted in an ideal or overly formal sense. Also, terms, such as those defined in commonly used dictionaries, should be interpreted as having a meaning that is consistent with their meaning in the context of the relevant art and should not be interpreted in an idealized or overly formal sense unless expressly so defined herein.

Hereinafter, a display device according to an embodiment and a method for manufacturing a display device will be described with reference to the accompanying drawings.

According to an embodiment, FIG. 1A is a perspective view showing a state in which an electronic device is unfolded. FIG. 1B is a perspective view showing an inner-folding process of the electronic device shown in FIG. 1A. FIG. 1C is a perspective view showing an outer-folding process of the electronic device shown in FIG. 1A.

In an embodiment, an electronic device ED may be a device activated according to electrical signals. For example, the electronic device ED may be a mobile phone, a tablet, a car navigation system, a game console, and/or a wearable device, but the embodiment is not limited thereto. In FIG. 1A, and the like herein, as an example, a mobile phone is shown as the electronic device ED.

Referring to FIGS. 1A to 1C, the electronic device ED according to an embodiment may include a first display surface FS defined by a first directional axis DR1 and a second directional axis DR2 crossing the first directional axis DR1. The electronic device ED may provide an image IM to users through the first display surface FS. The electronic device ED according to an embodiment may display an image IM towards the third directional axis DR3 on the first display surface FS parallel to a first directional axis DR1 and a second directional axis DR2, respectively. In the present description, a front surface (or an upper surface) and a rear surface (or a lower surface) of respective members are defined with respect to a direction in which the image IM is displayed. Front and rear surfaces may oppose each other in a third directional axis DR3 and the normal direction of each of the front and rear surfaces may be parallel to the third directional axis DR3.

The electronic device ED according to an embodiment may include the first display surface FS and a second display surface RS. The first display surface FS may include an active region F-AA and a peripheral region F-NAA. The active region F-AA may include an electronic module region EMA. The second display surface RS may be defined as a surface facing at least a portion of the first display surface FS. That is, the second display surface RS may be defined as a portion of the rear surface of the electronic device ED.

The electronic device ED according to an embodiment may detect external inputs applied from the outside. The external inputs may include various forms of inputs provided from outside the electronic device ED. For example, the external inputs may include external inputs applied when approaching the electronic device ED and/or being adjacent by a predetermined distance (e.g., hovering), as well as contact by a part of a body such as a user's hand. In addition, the external inputs may have various forms such as force, pressure, temperature, light, and/or the like.

Meanwhile, in an embodiment, FIG. 1A and the following drawings show the first to third directional axes DR1 to DR3, respectively, and directions indicated by the first to third directional axes DR1, DR2, and DR3, respectively, described herein are relative concepts, and may thus be changed to other directions. In addition, the directions indicated by the first to third directional axes DR1, DR2, and DR3, respectively, may be described as first to third directions, respectively, and the same reference numerals may be used.

In an embodiment, the active region F-AA of the electronic device ED may be a region activated according to electrical signals. The electronic device ED according to an embodiment may display the image IM through the active region F-AA. In addition, the active region F-AA may detect various forms of external inputs. The peripheral region F-NAA is adjacent to the active region F-AA. The peripheral region F-NAA may have a predetermined color. The peripheral region F-NAA may cover the active region F-AA. Accordingly, the shape of the active region F-AA may be substantially defined by the peripheral region F-NAA. However, this is shown as an example, and the peripheral region F-NAA may be disposed adjacent to only one side of the active region F-AA, or may be omitted. The electronic device ED according to an embodiment may include various forms of active regions and is not limited to any one embodiment.

In an embodiment, the electronic device ED may include a folding region FA1 and non-folding regions NFA1 and NFA2. In an embodiment, the non-folding regions NFA1 and NFA2 may be disposed adjacent to the folding region FA1 with the folding region FA1 located therebetween. The electronic device ED of an embodiment may include a first non-folding region NFA1 and a second non-folding region NFA2, which are spaced apart with the folding region FA1 therebetween in the first directional axis DR1. For example, the first non-folding region NFA1 may be disposed at one side of the folding region FA1 in the first direction DR1, and the second non-folding region NFA2 may be disposed at the other side of the folding region FA1 in the first direction DR1.

Meanwhile, FIGS. 1A to 1C show an embodiment of the electronic device ED including one folding region FA1, but the embodiment is not limited thereto, and in the electronic device ED, a plurality of folding regions may be defined. For example, the electronic device according to an embodiment may include two or more folding regions and three or more non-folding regions disposed with each of the folding regions therebetween.

Referring to FIG. 1B, the electronic device ED according to an embodiment may be folded with respect to the first folding axis FX1. The first folding axis FX1 is a virtual axis extending in a direction of the second directional axis DR2, and the first folding axis FX1 may be parallel to a long side direction of the electronic device ED. The first folding axis FX1 may extend along the second directional axis DR2 on the first display surface FS.

In an embodiment, the electronic device ED may be folded with respect to the first folding axis FX1 to become in-folded such that one region overlapping the first non-folding region NFA1 and the other region overlapping the second non-folding region NFA2 on the first display surface FS face each other.

Meanwhile, in the electronic device ED according to an embodiment, the second display surface RS may be viewed in an inner-folded state by users. The second display surface RS may further include an electronic module region in which an electronic module including various components is disposed, and is not limited to any one embodiment.

In an embodiment and referring to FIG. 1C, the electronic device ED may be folded with respect to the first folding axis FX1 to become outer-folded such that one region overlapping the first non-folding region NFA1 and the other region overlapping the second non-folding region NFA2 on the second display surface RS face each other.

However, the embodiment is not limited thereto, and the electronic device ED may be folded with respect to a plurality of folding axes such that portions of each of the first display surface FS and the second display surface RS may face each other, and the number of folding axes and the number of the corresponding non-folding regions are not particularly limited.

In an embodiment, the electronic module region EMA may have various electronic modules disposed. For example, the electronic module may include at least any one among a camera, a speaker, a light detection sensor, and a heat detection sensor. The electronic module region EMA may detect an external subject received through the first and/or second display surfaces FS and RS, and/or may provide sound signals such as voice to the outside through the first and/or second display surfaces FS and RS. The electronic modules may include a plurality of components, and are not limited to any one embodiment.

In an embodiment, the electronic module region EMA may be surrounded by the active region F-AA and the peripheral region F-NAA. However, the embodiment is not limited thereto, and the electronic module region EMA may be disposed in the active region F-AA, but is not limited to any one embodiment.

In an embodiment, FIG. 2A is a perspective view showing a state in which an electronic device is unfolded. FIG. 2B is a perspective view showing an inner-folding process of the electronic device shown in FIG. 2A. FIG. 2C is a perspective view showing an outer-folding process of the electronic device shown in FIG. 2A.

In an embodiment, an electronic device ED-a may be folded with respect to a second folding axis FX2 extending in one direction which is parallel to the second directional axis DR2. FIG. 2B shows a case in which a direction that the second folding axis FX2 extends is parallel to a direction that a short side of the electronic device ED-a extends. However, the embodiment is not limited thereto.

The electronic device ED-a according to an embodiment may include at least one folding region FA2 and non-folding regions NFA3 and NFA4 adjacent to the folding region FA2. The non-folding regions NFA3 and NFA4 may be spaced apart with the folding region FA2 therebetween.

In an embodiment, the folding region FA2 has a predetermined curvature and a predetermined radius of curvature. In an embodiment, the first non-folding region NFA3 and the second non-folding region NFA4 may face each other, and the electronic device ED-a may be inner-folded such that the first display surface FS is not exposed to the outside. In addition, referring to FIG. 2C, in an embodiment, the electronic device ED-a may be outer-folded such that the first display surface FS is exposed to the outside.

The electronic device ED-a according to an embodiment may include a second display surface RS, and the second display surface RS may be defined as a surface facing at least a portion of the first display surface FS. The second display surface RS may include an electronic module region EMA in which electronic modules including various components are disposed. In addition, images and/or videos may be displayed on at least a portion of the second display surface RS.

Meanwhile, in an embodiment, when the electronic device ED-a is in the unfolded state, the first display surface FS may be viewed by users and when being in the inner-folded state, the second display surface RS may be viewed by users.

In an embodiment, the electronic devices ED and ED-a may be configured such that an inner-folding operation and/or an outer-folding operation is mutually repeated from an unfolding operation, but the embodiment of the inventive concept is not limited thereto. In an embodiment, the electronic devices ED and ED-a may be configured to select any one of an unfolding operation, an inner-folding operation, or an outer-folding operation. In addition, when a plurality of folding regions are included, a folding direction of at least one of the plurality of folding regions may be different from a folding direction of the other folding regions. For example, when two folding regions are included, two non-folding regions with one folding region therebetween are folded by an inner-folding operation, and the two non-folding regions with the other folding region therebetween may be folded through an outer-folding operation.

FIG. 3 is an exploded perspective view of an electronic device according to an embodiment. FIG. 4 is a cross-sectional view of an electronic device according to an embodiment. FIG. 3 shows an exploded perspective view of an electronic device according to an embodiment shown in FIG. 1A as an example. FIG. 4 is a cross-sectional view showing a portion corresponding to line I-I' of FIG. 3.

Meanwhile, in an embodiment, FIGS. 3 and 4, and the like show a case in which a folding axis FX1 of the electronic device ED shown in FIG. 1A and the like is parallel to a long side of the electronic device ED, but the embodiment is not limited thereto, and descriptions with reference to the drawings below may also apply to a case in which a folding axis FX2 is parallel to a short side of the electronic device as shown in FIG. 2A and the like.

Referring to FIGS. 3 and 4, the electronic device ED of an embodiment may include a display device DD and a window WM disposed above the display device DD. The display device DD of an embodiment may include a display module DM, and a support member LM disposed below the display module DM. The support member LM may include a support plate MP disposed below the display module DM.

The electronic device ED of an embodiment may further include a window adhesive layer AP-W disposed between the display device DD and the window WM, and may also further include a protection film PL and an adhesive protection layer AP-PL disposed above the window WM. Meanwhile, in the electronic device ED of an embodiment, the protection film PL and the adhesive protection layer AP-PL may be omitted. When the protection film PL and the adhesive protection layer AP-PL are omitted, the window WM may be an uppermost surface of the electronic device ED.

In an embodiment, the electronic device ED may include a housing HAU accommodating the display module DM, the support member LM, and the like. The housing HAU may be bonded to the window WM. Although not shown, the housing HAU may further include a hinge structure to make folding and/or bending easy. The window WM may be a cover window disposed on the display module DM.

The electronic device ED of an embodiment may include a window adhesive layer AP-W disposed between display module DM and the window WM. The window adhesive layer AP-W may be an optically clear adhesive film (OCA) or an optically clear adhesive resin layer (OCR). Meanwhile, in an embodiment, the window adhesive layer AP-W may be omitted.

In an embodiment, the window WM may cover the entire upper surface of the display module DM. The window WM may have a shape corresponding to the shape of the display module DM. The window WM includes glass and may be used as a cover window of the electronic device ED.

In an embodiment, the window WM may include a folding portion FP-W and non-folding portions NFP1-W and NFP2-W. The first non-folding portion NFP1-W and the second non-folding portion NFP2-W of the window WM may be spaced apart in the first direction DR1 with the folding portion FP-W therebetween. The folding portion FP-W may be a portion corresponding to the folding region FA1 (FIG. 1A), and the non-folding portions NFP1-W and NFP2-W may be portions corresponding to the non-folding regions NFA1 and NFA2 (FIG. 1A).

In an embodiment, the window WM may have a structure of bonding glass in which a plurality of glass substrates are bonded together. The bonded glass substrates may each be a tempered glass substrate. In addition, the bonded glass substrates may each be an ultra-thin glass substrate.

In an embodiment, the display module DM may display images according to electrical signals and/or transmit/receive information on external inputs. The display module DM may include a display region DP-DA and a non-display region DP-NDA. The display region DP-DA may be defined as a region outputting images provided from the display module DM.

In an embodiment, the non-display region DP-NDA is adjacent to the display region DP-DA. For example, the non-display region DP-NDA may surround the display region DP-DA. However, this is shown as an example, and the non-display region DP-NDA may be defined in various shapes, and is not limited to any one embodiment. According to an embodiment, the display region DP-DA of the display module DM may correspond to at least a portion of the first active region F-AA (FIG. 1A).

In an embodiment, the display module DM may include a display panel DP. The display panel DP may be a light emitting-type display panel, but is not particularly limited thereto. For example, the display panel DP may be an organic light emitting display panel and/or an inorganic light emitting display panel. An emission layer of the organic light emitting display panel may include an organic light emitting material. An emission layer of the inorganic light emitting display panel may include quantum dots, quantum rods, etc.

In an embodiment, the display module DM may further include an input sensor IS. The input sensor IS may be directly disposed on the display panel DP. The input sensor IS may include a plurality of sensing electrodes. The input sensor IS may detect external inputs using a self-cap method and/or a mutual-cap method. The input sensor IS may detect inputs by an active-type input device.

In an embodiment, the input sensor IS may be directly formed on the display panel DP through a continuous process when the display panel DP is manufactured. However, the embodiment is not limited thereto, and the input sensor IS may be manufactured as a separate panel apart from the display panel DP, and be attached to the display panel DP through an adhesive layer (not shown).

In addition, in an embodiment, the display module DM may further include an optical layer RCL. The optical layer RCL may serve to reduce reflection by external light. For example, the optical layer RCL may include a polarizing layer and/or a color filter layer. However, the embodiment is not limited thereto, and the optical layer RCL may include optical members for improving display quality of the electronic device ED.

In an embodiment, the optical layer RCL may be directly disposed on the input sensor IS. In addition, when the input sensor IS is omitted from the display module DM, the optical layer RCL may be directly disposed on the display panel DP. However, the embodiment is not limited thereto, and the optical layer RCL may be disposed on the display panel DP or the input sensor IS, using a separate adhesive member.

In an embodiment, the display module DM may include a folding display portion FP-D and non-folding display portions NFP1-D and NFP2-D. The folding display portion FP-D may be a portion corresponding to the folding region FA1 (FIG. 1A), and the non-folding display portions NFP1-D and NFP2-D may be portions corresponding to the non-folding regions NFA1 and NFA2 (FIG. 1A).

In an embodiment, the folding display portion FP-D may correspond to a portion that is folded and/or bent with respect to the first folding axis FX1 (FIGS. 1B and 1C). The display module DM may include a first non-folding display portion NFP1-D and a second non-folding display portion NFP2-D, and the first non-folding display portion NFP1-D and the second non-folding display portion NFP2-D may be spaced apart with the folding display portion FP-D therebetween.

In the electronic device ED according to an embodiment, the support member LM may include a support plate MP. In addition, in an embodiment, the support member LM may further include at least one of a support module SM, a protection layer PF, and/or a buffer layer CPN. For example, the electronic device ED according to an embodiment may include a support plate MP disposed below a display module DM, a protection layer PF and a buffer layer CPN disposed between the support plate MP and the display module DM, and a support module SM disposed below a support plate MP.

In an embodiment, the support plate MP may be disposed below the display module DM. The support plate MP may include a folding support portion FP-MP and non-folding support portions NFP1-MP and NFP2-MP. The first non-folding support portion NFP1-MP and the second non-folding support portion NFP2-MP of the support plate MP may be spaced apart with the folding support portion FP-MP therebetween. The folding support portion FP-MP may be a portion corresponding to the folding region FA1 (FIG. 1A), and the non-folding support portions NFP1-MP and NFP2-MP may be portions corresponding to the non-folding regions NFA1 and NFA2 (FIG. 1A).

In an embodiment, the support plate MP may have a thickness T1 of about 50 μm to about 300 μm. When the thickness T1 of the support plate MP is less than about 50 μm, the support plate MP may not exhibit satisfactory impact resistance. When the thickness T1 of the support plate MP is greater than about 300 μm, the support plate MP may not exhibit satisfactory flexibility. The support plate MP of an embodiment has a thickness T1 of about 50 μm to about 300 μm, and may thus exhibit both excellent impact resistance and excellent flexibility.

In an embodiment and referring to FIGS. 3 and 4, a protection layer PF may be disposed between the display module DM and the support plate MP. The protection layer PF may be a layer disposed below the display module DM to protect a rear surface of the display module DM. The protection layer PF may overlap the entire display module DM. The protection layer PF may include a plastic material. For example, the protection layer PF may be constructed from a polyimide film and/or a polyethylene terephthalate film. However, this is presented as an example, and the material of the protection layer PF is not limited thereto.

The electronic device ED according to an embodiment may include the support module SM. The support module SM may include a support portion SPM and a filling portion SAP. The support portion SPM may be a portion overlapping most regions of the display module DM. The filling portion SAP may be a portion disposed outside the support portion SPM and overlapping the outer portion of the display module DM.

In an embodiment, the support module SM may include a support layer ST. The support layer ST may include a first sub-support layer SP1 and a second sub-support layer SP2 spaced apart in a direction of the first directional axis DR1.

The first sub-support layer SP1 and the second sub-support layer SP2 may be spaced apart at a portion corresponding to the first folding axis FX1 (FIGS. 1B and 1C). The support layer ST includes sub-support layer SP1 and the second sub-support layer SP2 provided spaced apart in the folding region FA1, thereby improving folding and/or bending characteristics of the electronic device ED. Meanwhile, although not shown, the support layer ST may include a cushion layer (not shown) and a lower support plate (not shown) which are stacked in the thickness direction.

In an embodiment, the lower support plate (not shown) may include a metal material and/or a polymer material. For example, the lower support plate may be formed including stainless steel, aluminum, copper, and/or an alloy thereof.

In an embodiment, the cushion layer (not shown) may prevent the support plate MP from being pressed and deformed due to external impact and force. The cushion layer (not shown) may include sponge, foam, and/or elastomer such as a urethane resin. In addition, the cushion layer (not shown) may be formed to include at least one of an acrylic polymer, a urethane-based polymer, a silicone-based polymer, and an imide-based polymer. However, the embodiment is not limited thereto. The cushion layer (not shown) may be disposed below the support plate MP and/or below the lower support plate (not shown).

In addition, in an embodiment, the support module SM may further include at least one of a shielding layer EMP or an interlayer adhesive layer ILP. The shielding layer EMP may be an electromagnetic wave shielding layer or a heat dissipation layer. In addition, the shielding layer EMP may serve as a bonding layer. The support module SM and the housing HAU may be bonded using the shielding layer EMP.

In an embodiment, the support module SM may further include an interlayer adhesive layer ILP disposed above the support layer ST. The interlayer adhesive layer ILP may bond the support plate MP and the support module SM. The interlayer adhesive layer ILP may be provided in the form of a bonding resin layer or an adhesive tape. For example, the interlayer adhesive layer ILP may have a portion overlapping the folding display portion FP-D removed therefrom. However, the embodiment is not limited thereto, and the interlayer adhesive layer ILP may overlap the entire folding display portion FP-D.

In an embodiment, the filling portion SAP may be disposed outside the support layer ST. The filling portion SAP may be disposed between the support plate MP and the housing HAU. The filling portion SAP may fill a space between the support plate MP and the housing HAU, and fix the support plate MP.

Referring to FIGS. 3 and 4, the electronic device ED of an embodiment may include the buffer layer CPN in the support member LM. The buffer layer CPN may serve as a thickness compensation layer compensating for the thickness below the display module DM and/or serve as a support layer supporting the display module DM. Meanwhile, unlike what is shown, the buffer layer CPN may be omitted in an embodiment.

A combination of components included in the support member LM in the electronic device ED of an embodiment may vary depending on the size and shape of the electronic device ED and/or operation characteristics of the electronic device ED.

In addition, the electronic device ED of an embodiment may further include at least one adhesive layer AP1, AP2, or AP3. For example, the first adhesive layer AP1 may be disposed between the display module DM and the protection layer PF, the second adhesive layer AP2 may be disposed between the protection layer PF and the buffer layer CPN, and the third adhesive layer AP3 may be disposed between the support plate MP and the buffer layer CPN. The at least one adhesive layer AP1, AP2, or AP3 may be an optically clear adhesive film (OCA) or an optically clear adhesive resin layer (OCR). However, the embodiment is not limited thereto, and the at least one adhesive layer AP1, AP2, or AP3 may be an adhesive layer having a transmittance of 80% or less.

The electronic device ED of an embodiment may further include a protection film PL disposed above the window WM. The protection film PL may be disposed above the window WM to protect the window WM from external environments. However, in the electronic device ED of an embodiment, the protection film PL may be omitted, and the window WM may be an uppermost surface of the electronic device ED.

In an embodiment, the adhesive protection layer AP-PL may be further disposed between the window WM and the protection film PL. The adhesive protection layer AP-PL may be an optically clear adhesive layer. When the electronic device ED of an embodiment includes the protection film PL, the protection film PL may be a layer exposed to the outside in the electronic device ED.

In an embodiment, the protection film PL may have optical properties such as a transmittance of about 90% or greater in a visible light region and a haze value of less than about 1%. The protection film PL may include a polymer film. In addition, the protection film PL may have the polymer film as a base layer and further include functional layers such as a hard coating layer, an anti-fingerprint coating layer, and/or an antistatic coating layer on the base layer. Meanwhile, the protection film PL used in the electronic device ED according to an embodiment may have flexibility.

FIG. 5A is a schematic view showing a support plate of an embodiment. FIG. 5B is a schematic view showing a support plate of an embodiment. FIG. 5C is an enlarged view showing a support plate of an embodiment. FIG. 5D is an enlarged view showing a support plate of an embodiment. FIG. 5C is a portion corresponding to portion AA shown in FIG. 5A. FIG. 5D is a portion corresponding to portion AA shown in FIG. 5A. The support plates shown in FIGS. 5C and 5D show different embodiments.

Referring to FIG. 5A, the support plate MP of an embodiment may include a plurality of sub-support plates SPL1 to SPLn. The sub-support plates SPL1 to SPLn may each include a fiber reinforced composite material. The fiber reinforced composite material may include carbon fiber reinforced plastic (CFRP) and/or glass fiber reinforced plastic (GFRP).

In an embodiment, the sub-support plates SPL1 to SPLn may each include matrix portions MX1 to MXn, and fibers FB1 to FBn dispersed in the matrix portions MX1 to MXn. Meanwhile, the embodiment is not limited thereto, and as shown in FIG. 5B, the support plate MP-1 of an embodiment may include a matrix portion MX provided as a single layer. That is, the support plate MP-1 may be in the form in which the fibers FB are stacked in the matrix portion MX provided as a single layer. Hereinafter, as for the support plate of an embodiment, the one provided in the form of a plurality of sub-support plates will be mainly described. Except that the support plate is provided as a single layer, the descriptions of the matrix portion MX and the fibers FB1 and FBn included in the support plate MP may also apply to each of a support plate MP including sub-support plates SPL1 to SPLn shown in FIG. 5A and a support plate MP-1 provided as a single layer shown in FIG. 5B.

In an embodiment and referring to FIG. 5B, the matrix portion MX may include a polymer resin. For example, the matrix portion MX may include at least one of a polyepoxy-based resin, a polyester-based resin, a polyamide-based resin, a polycarbonate-based resin, a polypropylene-based resin, a polybutylene-based resin, or a polyvinyl ester-based resin. However, the material of the matrix portion MX is not limited to the examples described above.

In an embodiment, the matrix portion MX may fix the fibers FB. The matrix portion MX may fill a space between the fibers FB1. The support plate MP-1 of an embodiment may include a matrix portion MX for fixing the fibers FB1 and filling the space between the fibers FB1, and thus have high strength.

In an embodiment, the first fiber FB1-1 may extend in the first direction DR1. The plurality of first fibers FB1-1 may be spaced apart in the second direction DR2. The second fibers FB1-2 may extend in the second direction DR2. The plurality of second fibers FB1-2 may be spaced apart in the first direction DR1. The first fibers FB1-1 and the second fibers FB1-2 may each include carbon fibers and/or glass fibers. However, this is only presented as an example, and the materials of the first fiber FB1-1 and the second fiber FB1-2 are not limited thereto.

Meanwhile, in an embodiment, the first fiber FB1-1 may be disposed higher than the second fiber FB1-2 in the third direction DR3. However, this is only presented as an example, and the embodiment is not limited thereto. For example, as shown in FIG. 5D, the first fiber FB1-1 may be disposed below the second fiber FB1-2 in the third direction DR3. Hereinafter, as shown in FIG. 5C, the description will be made on the premise that the first fiber FB1-1 is disposed higher than the second fiber FB1-2. The same descriptions of FIG. 5C may also be given, except that the first fiber FB1-1 is disposed below the second fiber FB1-2.

In an embodiment, the first fiber FB1-1 may include a plurality of first sub-fibers SF1 disposed to correspond to the folding support portion FP-MP, and a plurality of second sub-fibers SF2 disposed to correspond to the first non-folding support portion NFP1-MP and the second non-folding support portion NFP2-MP. The first sub-fibers SF1 may be spaced apart at a first interval W1 in the second direction DR2. The second sub-fibers SF2 may be spaced apart at a second interval W2 in the second direction DR2. The first interval W1 may be greater than the second interval W2. Accordingly, the folding support portion FP-MP may have a smaller Young's modulus at about 25° C. than each of the first non-folding support portion NFP1-MP and the second non-folding support portion NFP2-MP. Hereinafter, the Young's modulus described herein is defined as the Young's modulus measured at about 25° C.

In an embodiment, the number of first sub-fibers SF1 disposed per unit area in the folding support portion FP-MP may be smaller than the number of second sub-fibers SF2 disposed per unit area in each of the non-folding support portions NFP1-MP and NFP2-MP. Accordingly, the Young's modulus of the folding support portion FP-MP may be smaller than the Young's modulus of each of the first non-folding support portion NFP1-MP and the second non-folding support portion NFP2-MP.

Meanwhile, in an embodiment, the number of first sub-fibers SF1 and the number of second sub-fibers SF2 are not limited to those shown in the drawings. For example, the number of first sub-fibers SF1 disposed in the folding support portion FP-MP may be about 4 or greater, and the number is not limited as long as the folding support portion FP-MP has a smaller Young's modulus than the non-folding support portions NFP1-MP and NFP2-MP.

In an embodiment, the plurality of second fibers FB1-2 may be spaced apart at a predetermined interval W3 in the first direction DR1. The second fibers FB1-2 may all be spaced apart at equal intervals. However, this is only presented as an example, the embodiment is not limited thereto, and the second fibers FB1-2 may be spaced apart at different intervals.

Meanwhile, in an embodiment, the first fiber FB1-1 and the second fiber FB1-2 may cross each other at each of first and second crossing points CS1 and CS2. Specifically, in the folding support portion FP-MP, the first sub-fiber SF1 and the second fiber FB1-2 may cross at the first crossing point CS1, and in each of the non-folding support portions NFP1-MP and NFP2-MP, the second sub-fiber SF2 and the second fiber FB1-2 may cross at the second crossing point CS2. In an embodiment, the number of first crossing points CS1 per unit area may be smaller than the number of second crossing points CS2 per unit area. That is, the number of crossing points CS1 of the first fiber FB1-1 and the second fiber FB1-2 per unit area of the portion corresponding to the folding support portion FP-MP may be smaller than the number of crossing points CS2 of the first fiber FB1-1 and the second fiber FB1-2 per unit area of the portion corresponding to each of the first non-folding support portion NFP1-MP and the second non-folding support portion NFP2-MP. Accordingly, the Young's modulus of the folding support portion FP-MP may be smaller than the Young's modulus of each of the first non-folding support portion NFP1-MP and the second non-folding support portion NFP2-MP.

The support plate MP of an embodiment has a structure in which the folding support portion FP-MP has a smaller Young's modulus than each of the first non-folding support portion NFP1-MP and the second non-folding support portion NFP2-MP, and may thus exhibit both excellent impact resistance and excellent flexibility The display device DD of an embodiment includes the support plate MP of an embodiment, and may thus exhibit excellent impact resistance and excellent flexibility.

Meanwhile, in an embodiment, the folding support portion FP-MP may have a Young's modulus of about 0.1 GPa to about 10 GPa. When the Young's modulus of the folding support portion FP-MP is less than about 0.1 GPa, the folding support portion FP-MP may exhibit sagging due to the load of the display panel DP. When the Young's modulus of the folding support portion FP-MP is about 10 GPa or greater, the folding support portion FP-MP may have low flexibility, and accordingly, the support plate MP may have degraded folding properties. When the folding support portion FP-MP has a Young's modulus of about 0.1 GPa to about 10 GPa, the support plate MP of an embodiment may exhibit excellent flexibility and excellent impact resistance and may provide excellent folding properties to a display device.

Meanwhile, in an embodiment, the first non-folding support portion NFP1-MP and the second non-folding support portion NFP2-MP may have a Young's modulus of about 5 GPa to about 150 GPa. Meanwhile, when the Young's modulus of each of the first non-folding support portion NFP1-MP and the second non-folding support portion NFP2-MP is less than about 5 GPa, the support plate MP may not exhibit satisfactory impact resistance.

FIG. 6 is an enlarged view of a support plate of an embodiment. The support plate shown in FIG. 6 is different from those described in FIGS. 5C and 5D in that intervals between the first sub-fibers sequentially decrease in a direction further away from a folding axis.

Referring to FIG. 6, in an embodiment, the first fiber FB1-1 may further include third sub-fibers SF3 disposed between the first sub-fibers SF1 and the second sub-fibers SF2. The third sub-fibers SF3 may be spaced apart at a third interval W4 in the second direction DR2. The third interval W4 may be smaller than the first interval W1 and greater than the second interval W2. That is, the interval between the first fibers FB1-1 may decrease in a direction further away from the folding axis FX1 from a portion adjacent to the folding axis FX1. Accordingly, the Young's modulus of the folding support portion FP-MP may be smaller than the Young's modulus of each of the first non-folding support portion NFP1-MP and the second non-folding support portion NFP2-MP. In addition, the support plate of an embodiment may have a smaller Young's modulus in the portion closer to the folding axis FX1. The Young's modulus of the support plate of an embodiment may increase in a direction further away from the folding axis FX1 from the portion adjacent to the folding axis FX1.

The support plate of an embodiment has a structure in which the folding support portion FP-MP has a smaller Young's modulus than each of the first non-folding support portion NFP1-MP and the second non-folding support portion NFP2-MP, and may thus exhibit both excellent impact resistance and excellent flexibility The display device of an embodiment includes the support plate of an embodiment, and may thus exhibit excellent impact resistance and excellent flexibility.

Hereinafter, a method for manufacturing a support plate of an embodiment will be described with reference to FIGS. 7 to 10 according to an embodiment. Structural features of the support plate described with reference to FIGS. 1 to 6 will not be described again, and the features of the manufacturing method are mainly described.

FIG. 7 is a flowchart showing a method for manufacturing a support plate according to an embodiment. FIG. 8 is a schematic block diagram showing a step in a method for manufacturing a support plate according to an embodiment. FIG. 9 is a schematic block diagram showing a step in a method for manufacturing a support plate according to an embodiment. FIG. 10 is a schematic block diagram showing a step in a method for manufacturing a support plate according to an embodiment. FIG. 11A is a flowchart showing a method for manufacturing a support plate according to an embodiment. FIG. 11B is a schematic block diagram showing a step in a method for manufacturing a support plate according to an embodiment.

Referring to FIG. 7, the method for manufacturing a support plate according to an embodiment includes forming a matrix portion on a collecting portion (S100), forming first fibers in the matrix portion (S200), and forming second fibers in the matrix portion (S300).

FIG. 8 is a schematic block diagram showing forming a matrix portion on a collecting portion. The method for manufacturing a support plate according to an embodiment may be performed using a manufacturing instrument of a support plate.

Referring to FIG. 8, the manufacturing instrument of a support plate according to an embodiment may include a nozzle portion NZ, a first voltage applying portion VS1, a second voltage applying portion VS2, a spraying portion SPT, and a collecting portion DR. The nozzle portion NZ may be a member that sprays the fibers FB1-1 and FB1-2 (FIGS. 9 and 10) onto the collecting portion DR. The nozzle portion NZ may move horizontally in the first direction DR1. The first voltage applying portion VS1 may be configured to apply a first voltage to the nozzle portion NZ. The second voltage applying portion VS2 may be configured to apply a second voltage lower than the first voltage to the collecting portion DR. The spraying portion SPT may be configured to spray a preliminary matrix portion P-MX onto the collecting portion DR. The collecting portion DR may rotate with respect to a rotation axis RX extending in the second direction DR2.

The method for manufacturing a support plate according to an embodiment may include forming the matrix portion MX on the collecting portion DR. The forming of the matrix portion MX on the collecting portion DR may include a step that the spraying portion SPT sprays the preliminary matrix portion P-MX onto a portion of the collecting portion DR. The preliminary matrix portion P-MX may include at least one of a polyepoxy-based resin, a polyester-based resin, a polyamide-based resin, a polycarbonate-based resin, a poly-propylene-based resin, a polybutylene-based resin, or a polyvinyl ester-based resin. However, the type of the preliminary matrix portion P-MX is not limited thereto. Meanwhile, the shape and size of the matrix portion MX disposed on the collecting portion DR are not limited to those shown in FIG. 8.

Referring to FIG. 9, the method for manufacturing a support plate according to an embodiment may include forming first fibers FB1-2 in the matrix portion MX. In an embodiment, the forming of the first fibers FB1-2 in the matrix portion MX may include a step that the nozzle portion NZ sprays the preliminary fibers P-FB onto the matrix portion MX while the collecting portion DR is fixed. The nozzle portion NZ may spray the preliminary fibers P-FB while moving in the second direction DR2 on the collecting portion DR.

In an embodiment, the nozzle portion NZ may receive the first voltage, and the preliminary fibers P-FB sprayed from the nozzle portion NZ may be charged with the first voltage. The collecting portion DR is charged with a second voltage that is lower than the first voltage, and may thus collect the preliminary fibers P-FB charged with the first voltage. The method for manufacturing a support plate of an embodiment may use an electrospinning method.

In an embodiment, the first fibers FB1-2 collected on the collecting portion DR may extend in the second direction DR2. The first fibers FB1-2 may be spaced apart in the first direction DR1. The first fiber FB1-2 of FIG. 9 may correspond to the second fiber FB1-2 of FIG. 5B.

Meanwhile, in an embodiment, the preliminary fibers P-FB may be a composition including fibers. For example, the fibers may be carbon fibers and/or glass fibers. The fibers included in the preliminary fibers P-FB sprayed onto the matrix portion MX may be aligned in one direction in the matrix portion MX.

Referring to FIG. 10, the method for manufacturing a support plate according to an embodiment may include forming second fibers FB1-1 in the matrix portion MX. In an embodiment, the forming of the second fibers FB1-1 in the matrix portion MX may include a step that the collecting portion DR rotates with respect to the rotation axis RX, and the nozzle portion NZ sprays the preliminary fibers P-FB onto the matrix portion MX while being fixed on the collecting portion DR.

In an embodiment, the second fibers FB1-1 collected on the collecting portion DR may extend in the first direction DR1. The second fibers FB1-1 may be spaced apart in the second direction DR2. The second fiber FB1-1 of FIG. 10 may correspond to the first fiber FB1-1 of FIG. 5B.

In an embodiment, the method for manufacturing a support plate of an embodiment includes forming first fibers FB1-2 and forming second fibers FB1-1, so that a support plate having a lattice type fiber structure may be manufactured through a simplified process.

Meanwhile, in an embodiment, the forming of the second fibers FB1-1 on the matrix portion MX may include forming first sub-fibers SF1 spaced apart at a first interval W1 in the second direction DR2, and forming a plurality of second sub-fibers SF2 spaced apart at a second interval W2 smaller than the first interval W1 in the second direction DR2.

When using the method for manufacturing a support plate according to an embodiment, as shown in FIGS. 5B and 5C, a support plate is provided in which a portion corresponding to the folding support portion FP-MP has low fiber density, and a portion corresponding to the non-folding support portions NFP1-MP and NFP2-MP (FIG. 5B) has large fiber density.

FIG. 11A is a flowchart showing a method for manufacturing a support plate according to an embodiment. FIG. 11B is a view schematically showing compressing a matrix portion according to an embodiment. Referring to FIGS. 11A and 11B, the method for manufacturing a support plate according to an embodiment may further include stacking sub-support plates SPL1 to SPLn including a matrix portion MX on which first fibers FB1-2 and second fibers FB1-1 are formed (S400), disposing the stacked sub-support plates SPL1 to SPLn in a chamber CB including a vacuum pump PP (S500), and creating a vacuum state in the chamber CB through the vacuum pump PP to compress the matrix portion MX in the chamber CB (S600). The method for manufacturing a support plate according to an embodiment includes the compressing of matrix portions in the chamber CB, so that a support plate having excellent impact resistance may be manufactured.

A display device according to an embodiment includes a support plate that is foldable with respect to a folding axis extending in a first direction, and includes a matrix portion, first fibers extending in the first direction, and second fibers extending in a second direction. The support plate includes a folding support portion that is foldable and a non-folding support portion that is not foldable. In the support plate according to an embodiment, the number of first fibers disposed per unit area in the support folding portion is smaller than the number of first fibers disposed per unit area in the non-folding portion. Accordingly, in the support plate according to an embodiment, the folding support portion has a smaller Young's modulus than the on-folding support portion. Accordingly, the support plate according to an embodiment may exhibit excellent impact resistance and excellent flexibility, and a display device including the support plate may exhibit excellent impact resistance and excellent folding properties.

A display device according to an embodiment includes a support plate having a structure in which a folding support portion has a smaller fiber density than a non-folding support portion, and may thus exhibit excellent impact resistance and folding properties.

Although the invention has been described with reference to an embodiment, it will be understood that the invention should not be limited to these embodiments but various changes and modifications may be made by those skilled in the art without departing from the spirit and scope of the present disclosure.

Accordingly, the technical scope of the inventive concept is not intended to be limited to the contents set forth in the detailed description of the specification, but is intended to be defined by the appended claims. Moreover, the embodiments or parts of the embodiments may be combined in whole or in part without departing from the scope of the invention.

What is claimed is:

1. An electronic device including a display device, the display device including a folding region foldable with respect to a virtual folding axis which extends in a first direction, and a first non-folding region and a second non-folding region, which are spaced apart in a second direction which is perpendicular to the first direction with the folding region disposed therebetween, the display device comprising:

a display module including a folding display portion corresponding to the folding region, a first non-folding display portion corresponding to the first non-folding region, and a second non-folding display portion corresponding to the second non-folding region; and a support plate disposed below the display module and including a folding support portion corresponding to the folding region, a first non-folding support portion corresponding to the first non-folding region, and a second non-folding support portion corresponding to the second non-folding region, wherein the support plate includes:

a matrix portion;

a plurality of first fibers dispersed in the matrix portion, extending in the first direction, and spaced apart in the second direction; and a plurality of second fibers dispersed in the matrix portion, disposed above or below the plurality of first fibers and extending in the second direction, and spaced apart in the first direction, the first fibers each including:

a plurality of first sub-fibers corresponding to the folding support portion and spaced apart at a first interval; and a plurality of second sub-fibers corresponding to the first non-folding support portion and the second non-folding support portion, and spaced apart at a second interval, wherein the second interval is smaller than the first interval.

2. The electronic device of claim 1, wherein the folding support portion has a smaller Young's modulus at about 25° C. than each of the first non-folding support portion and the second non-folding support portion.

3. The electronic device of claim 2, wherein the folding support portion has a Young's modulus of about 0.1 GPa to about 10 GPa at about 25° C.

4. The electronic device of claim 2, wherein the first non-folding support portion and the second non-folding support portion each have a Young's modulus of about 5 GPa to about 150 GPa at about 25° C.

5. The electronic device of claim 1, wherein the plurality of first fibers further comprise third sub-fibers spaced apart at a third interval disposed between the first sub-fibers and the second sub-fibers, wherein the third interval is smaller than the first interval and larger than the second interval.

6. The electronic device of claim 1, wherein the plurality of first fibers and the plurality of second fibers each comprise glass fibers or carbon fibers.

7. The electronic device of claim 1, wherein the matrix portion comprises at least one of a polyepoxy-based resin, a polyester-based resin, a polyamide-based resin, a polycarbonate-based resin, a polypropylene-based resin, a polybutylene-based resin, or a polyvinyl ester-based resin.

8. The electronic device of claim 1, wherein the support plate has a thickness of about 50 μm to about 300 μm.

9. The electronic device of claim 1, wherein the matrix portion is formed as a single layer.

10. An electronic device including a display device, the display device including a folding region foldable with respect to a virtual folding axis which extends in a first direction, and a first non-folding region and a second non-folding region, which are spaced apart in a second direction which is perpendicular to the first direction with the folding region disposed therebetween, the display device comprising:

a display module including a folding display portion corresponding to the folding region, a first non-folding display portion corresponding to the first non-folding region, and a second non-folding display portion corresponding to the second non-folding region; and a support plate disposed below the display module and including a folding support portion corresponding to the folding region, a first non-folding support portion corresponding to the first non-folding region, and a second non-folding support portion corresponding to the second non-folding region, and including a plurality of sub-support plates stacked in a thickness direction, wherein the plurality of sub-support plates each include:

a matrix portion;

a plurality of first fibers dispersed in the matrix portion, extending in the first direction, and spaced apart in the second direction; and a plurality of second fibers dispersed in the matrix portion, disposed above or below the first fibers and extending in the second direction, and spaced apart in the first direction, wherein a number of first crossing points in which the first fibers and the second fibers cross per unit area at a portion corresponding to the folding support portion is smaller than a number of second crossing points in which the first fibers and the second fibers cross per unit area at a portion corresponding to the first non-folding support portion and the second non-folding support portion.

11. The electronic device of claim 10, wherein the folding support portion has a smaller Young's modulus at about 25° C. than each of the first non-folding support portion and the second non-folding support portion.

12. The electronic device of claim 11, wherein the folding support portion has a Young's modulus of about 0.1 GPa to about 10 GPa.

13. The electronic device of claim 11, wherein the first non-folding support portion and the second non-folding support portion each have a Young's modulus of about 5 GPa to about 150 GPa.

14. The electronic device of claim 10, wherein an interval between the plurality of first fibers decreases in a direction extending away from the folding axis from a portion adjacent to the folding axis.

15. The electronic device of claim 10, wherein the first fibers and the second fibers each comprise glass fibers or carbon fibers.

16. The electronic device of claim 10, wherein the matrix portion comprises at least one of a polyepoxy-based resin, a polyester-based resin, a polyamide-based resin, a polycarbonate-based resin, a polypropylene-based resin, a polybutylene-based resin, or a polyvinyl ester-based resin.

17. The electronic device of claim 10, wherein the support plate has a thickness of about 50 μm to about 300 μm.

18. An electronic device including a display device, the display device including a folding region foldable with respect to a virtual folding axis which extends in a first direction, and a first non-folding region and a second non-folding region, which are spaced apart in a second direction which is perpendicular to the first direction with the folding region disposed therebetween, the display device comprising:

a display module including a folding display portion corresponding to the folding region, a first non-folding display portion corresponding to the first non-folding region, and a second non-folding display portion corresponding to the second non-folding region; and a support plate disposed below the display module and including a folding support portion corresponding to the folding region, a first non-folding support portion corresponding to the first non-folding region, and a second non-folding support portion corresponding to the second non-folding region, and including a plurality of sub-support plates stacked in a thickness direction, wherein the plurality of sub-support plates each include:

a matrix portion;

a plurality of first fibers dispersed in the matrix portion, extending in the first direction, and spaced apart in the second direction; and a plurality of second fibers dispersed in the matrix portion, disposed above or below the first fibers and extending in the second direction, and spaced apart in the first direction, wherein a number of the plurality of first fibers disposed per unit area at a portion corresponding to the folding support portion is smaller than a number of the plurality of first fibers disposed per unit area at each of the first non-folding support portion and the second non-folding support portion.

19. The electronic device of claim 18, wherein the folding support portion has a smaller Young's modulus than each of the first non-folding support portion and the second non-folding support portion, the folding support portion has a Young's modulus of about 0.1 GPa to about 10 GPa, and the first non-folding support portion and the second non-folding support portion each have a Young's modulus of about 5 GPa to about 150 GPa.

20. The electronic device of claim 19, wherein the support plate has a thickness of about 50 μm to about 300 μm.

21. The electronic device of claim 20, wherein the plurality of first fibers and the plurality of second fibers each comprise glass fibers or carbon fibers, and the matrix portion comprises at least one of a polyepoxy-based resin, a polyester-based resin, a polyamide-based resin, a polycarbonate-based resin, a polypropylene-based resin, a polybutylene-based resin, or a polyvinyl ester-based resin.

\* \* \* \* \*